(12) United States Patent
Sugahara et al.

(10) Patent No.: US 8,009,188 B2
(45) Date of Patent: Aug. 30, 2011

(54) VIDEO DATA PROCESSING APPARATUS UTILIZING VIEWER INFLUENCE, PICTURE REPRODUCING APPARATUS, AND COMPUTER PROGRAMS RELATED THERETO

(75) Inventors: Takayuki Sugahara, Yokosuka (JP); Koya Suehiro, Machida (JP)

(73) Assignee: Victor Company of Japan, Ltd., Yokohama (JP)

( * ) Notice: Subject to any disclaimer, the term of this patent is extended or adjusted under 35 U.S.C. 154(b) by 1651 days.

(21) Appl. No.: 11/312,535

(22) Filed: Dec. 21, 2005

(65) Prior Publication Data
US 2006/0192851 A1     Aug. 31, 2006

(30) Foreign Application Priority Data

Feb. 28, 2005   (JP) ................... 2005-054888

(51) Int. Cl.
*H04N 13/04*     (2006.01)
(52) U.S. Cl. ......... 348/51; 348/77; 348/222.1; 348/154; 348/128; 348/42
(58) Field of Classification Search ............. 348/51, 348/77, 222.1, 42; 382/128, 154
See application file for complete search history.

(56) References Cited

U.S. PATENT DOCUMENTS

| | | | |
|---|---|---|---|
| 6,212,329 B1 | 4/2001 | Sugahara | |
| 6,515,709 B1 * | 2/2003 | Kamada | 348/553 |

FOREIGN PATENT DOCUMENTS

| | | | |
|---|---|---|---|
| JP | 2853727 | | 11/1998 |
| JP | 2003-157136 | | 5/2003 |
| JP | 2004-246725 | | 9/2004 |
| JP | 2004246725 A | * | 9/2004 |
| JP | 2004-357156 | | 12/2004 |

OTHER PUBLICATIONS

Japanese proposed guidelines on 3D pictures, "Feasibility Study on Development of System for Generally Assessing Influence of 3D pictures on Human Body", Jul. 2002. (English explanation in present application).
Japanese Report "Meeting for Investigation on Broadcasting and Visual and Hearing Sensations", Jun. 28, 1998. (English explanation in present application).
ITC Guidance Note, issued in Jun. 2002.

* cited by examiner

*Primary Examiner* — Jason Chan
*Assistant Examiner* — Usman Khan
(74) *Attorney, Agent, or Firm* — Louis Woo

(57) ABSTRACT

Every prescribed unit of video data is analyzed to estimate a degree of influence of pictures represented by every prescribed unit of video data on a viewer. For example, every prescribed unit of three-dimensional video data is analyzed to estimate a degree of influence of a depth in three-dimensional pictures represented by every prescribed unit of three-dimensional video data on a viewer. Information is generated which represents the estimated influence degree. Every prescribed unit of video data and the generated information are outputted while they are related to each other.

3 Claims, 24 Drawing Sheets

FIG. 2
PRIOR ART

| ATTRIBUTES OF VIDEO CONTENTS \ CONTENTS BIOLOGICAL INFLUENCE LEVEL | 1 | 2 | 3 | 4 | 5 | 6 | 7 | 8 |
|---|---|---|---|---|---|---|---|---|
| RATIO IN AREA OF HIGH CONTRAST REGION TO ENTIRE PICTURE | NONE | BELOW 5% | BELOW 10% | BELOW 15% | BELOW 20% | BELOW 25% | BELOW 30% | 30% OR ABOVE |
| FLASHING TEMPORAL FREQUENCY | NONE | BELOW 3 Hz | BELOW 5 Hz | BELOW 8 Hz | BELOW 10 Hz | BELOW 15 Hz | BELOW 20 Hz | 20 Hz OR ABOVE |
| CONVERGENCE ANGLE FOR BINOCULAR STEREOPSIS | NONE | BELOW 6 min | BELOW 12 min | BELOW 18 min | BELOW 24 min | BELOW 30 min | BELOW 34 min | 34 min OR ABOVE |
| SPATIAL FREQUENCY OF RECURRENCE OF SIMPLE FIGURE IN ENTIRE PICTURE | NONE | BELOW 1 cpd | BELOW 2 cpd | BELOW 3 cpd | BELOW 4 cpd | BELOW 5 cpd | BELOW 6 cpd | 6 cpd OR ABOVE |

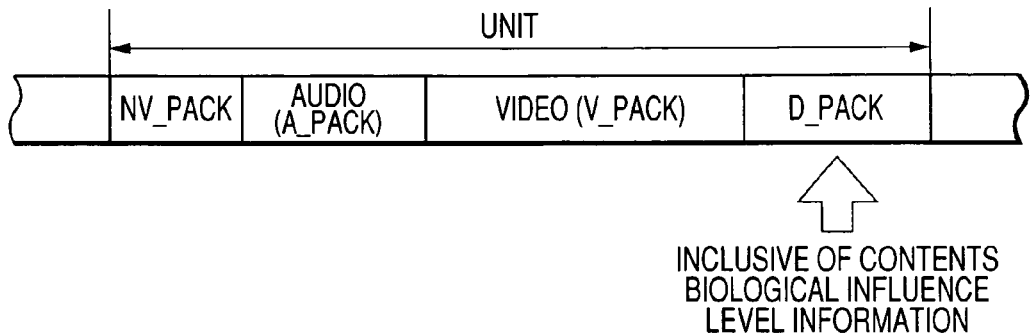
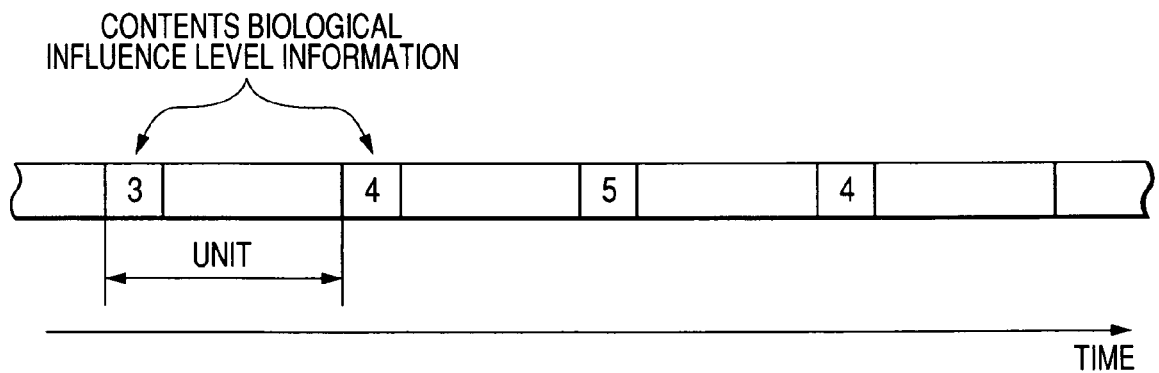
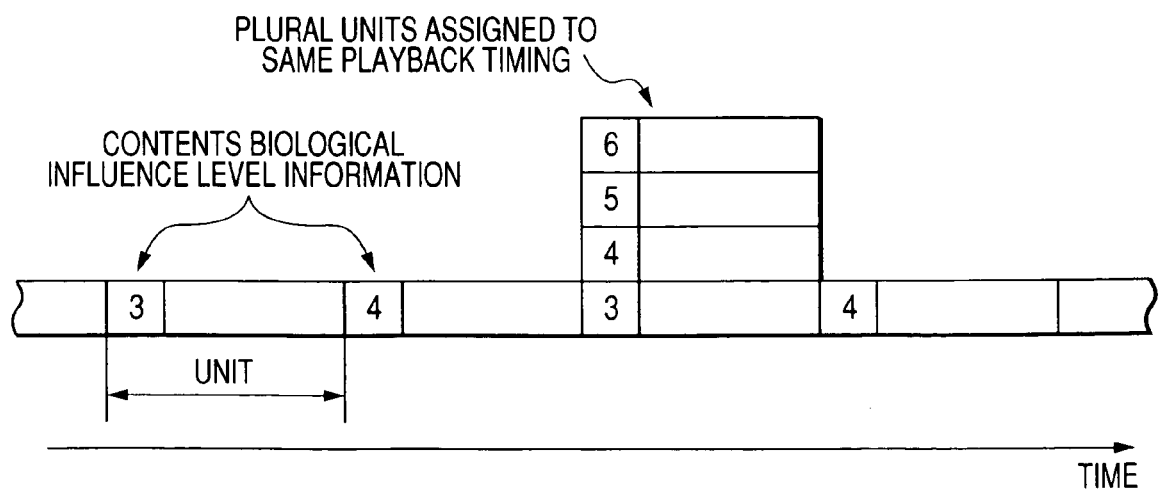

FIG. 16

CONTENTS BIOLOGICAL INFLUENCE LEVEL

|  | 1 | 2 | 3 | 4 | 5 | 6 | 7 | 8 |
|---|---|---|---|---|---|---|---|---|
| 1 | ○ | × | × | × | × | × | × | × |
| 2 | ○ | ○ | × | × | × | × | × | × |
| 3 | ○ | ○ | ○ | × | × | × | × | × |
| 4 | ○ | ○ | ○ | ○ | × | × | × | × |
| 5 | ○ | ○ | ○ | ○ | ○ | × | × | × |
| 6 | ○ | ○ | ○ | ○ | ○ | ○ | × | × |
| 7 | ○ | ○ | ○ | ○ | ○ | ○ | ○ | × |
| 8 | ○ | ○ | ○ | ○ | ○ | ○ | ○ | ○ |

BIOLOGICAL INFLUENCE VIEW LEVEL

FIG. 28

CONTENTS BIOLOGICAL INFLUENCE LEVEL

<table>
<tr><th></th><th>1</th><th>2</th><th>3</th><th>4</th><th>5</th><th>6</th><th>7</th><th>8</th></tr>
<tr><td>1</td><td>1</td><td>1/2</td><td>1/3</td><td>1/4</td><td>1/5</td><td>1/6</td><td>1/7</td><td>1/8</td></tr>
<tr><td>2</td><td>1</td><td>1</td><td>2/3</td><td>2/4</td><td>2/5</td><td>2/6</td><td>2/7</td><td>2/8</td></tr>
<tr><td>3</td><td>1</td><td>1</td><td>1</td><td>3/4</td><td>3/5</td><td>3/6</td><td>3/7</td><td>3/8</td></tr>
<tr><td>4</td><td>1</td><td>1</td><td>1</td><td>1</td><td>4/5</td><td>4/6</td><td>4/7</td><td>4/8</td></tr>
<tr><td>5</td><td>1</td><td>1</td><td>1</td><td>1</td><td>1</td><td>5/6</td><td>5/7</td><td>5/8</td></tr>
<tr><td>6</td><td>1</td><td>1</td><td>1</td><td>1</td><td>1</td><td>1</td><td>6/7</td><td>6/8</td></tr>
<tr><td>7</td><td>1</td><td>1</td><td>1</td><td>1</td><td>1</td><td>1</td><td>1</td><td>7/8</td></tr>
<tr><td>8</td><td>1</td><td>1</td><td>1</td><td>1</td><td>1</td><td>1</td><td>1</td><td>1</td></tr>
</table>

BIOLOGICAL INFLUENCE VIEW LEVEL

VIDEO DATA PROCESSING APPARATUS UTILIZING VIEWER INFLUENCE, PICTURE REPRODUCING APPARATUS, AND COMPUTER PROGRAMS RELATED THERETO

BACKGROUND OF THE INVENTION

1. Field of the Invention

This invention relates to a video data processing apparatus such as a two-dimensional (2D) or three-dimensional (3D or stereoscopic) video data processing apparatus. This invention also relates to a picture reproducing apparatus such as a 2D, 3D, or stereoscopic picture reproducing apparatus. In addition, this invention relates to a computer program for processing video data such as 2D, 3D, or stereoscopic video data. This invention also relates to a computer program for reproducing 2D, 3D, or stereoscopic pictures. In addition, this invention relates to a method of processing video data such as 2D, 3D, or stereoscopic video data. Furthermore, this invention relates to a method of reproducing 2D, 3D, or stereoscopic pictures. This invention also relates to a recording medium storing video data such as 2D, 3D, or stereoscopic video data.

2. Description of the Related Art

Digital technologies and computer graphics provide various methods of virtually indicating three-dimensional (3D) pictures on the basis of two-dimensional (2D) pictures. Indicated virtual 3D pictures basically different from actual 3D images perceived by human beings. Studies have been made as to the influence of the viewing of virtual 3D pictures on human beings, and whether or not the viewing of virtual 3D pictures is safe for human beings. The results of the studies reveal that the viewing of virtual 3D pictures tend to affect the viewer's visual sensation, for example, the sensation of the depth of an actual 3D object. In addition, it has been found that the unnatural visual sensation of the depth of an actual 3D object adversely affects a human body.

Japanese proposed guidelines on 3D pictures, "Feasibility Study on Development of System for Generally Assessing Influence of 3D pictures on Human Body", published by the Machine System Promotion Society in July 2002, report that the exposure of human eyes to virtual 3D pictures using the binocular parallax and the motion parallax inevitably affects human bodies.

Examples of viewer-related items concerning the influence of the display of pictures on human bodies are the age, the degree of immersion in the pictures, the visual sensation, the autonomic nervous system, the viewing environments, and the viewing time. Examples of contents-related items are the spatial frequency, the temporal frequency, the resolution, the contrast, the flicker, and the distortion. These viewer-related and contents-related items are applicable to not only 2D pictures but also virtual 3D pictures. Other examples of viewer-related items applicable only to virtual 3D pictures are the binocular parallax and the convergence.

The above-indicated Japanese proposed guidelines point out that the viewing of virtual 3D pictures using the binocular parallax and the motion parallax in childhood may adversely affect the growth of the visual sensation. The Japanese proposed guidelines disclose the conditions of the typical growth of the cornea, the retina, the stereopsis, the fringe acuity, the blink reflex to an electric impulse, the optic nerve, the blink reflex to a light impulse, and the focus adjustment in children 0 to 10 years old. The disclosure shows that there are stages during which some of these functions actively grow and stages during which they grow not so actively.

Japanese report "Meeting for Investigation on Broadcasting and Visual and Hearing Sensations", published on Jun. 28, 1998, put on the Internet web site <URL: http://www.johotsusintokei.soumu.go.jp/whitepaper/ja/h11/press/japanese/housou/0626j12.htm>, indicates that a popular animation television program caused hundreds of child viewers to have a fit of photosensitive epilepsy on Dec. 16, 1997 in Japan. The Japanese report further indicates that stimulative 12-Hz flashing images in the program caused a fit of photosensitive epilepsy, and those images had a red-blue mixed color. The Japanese report discloses light-related factors having the effect of creating reaction in viewer's brain which may cause a fit of photosensitive epilepsy in a viewer. The light-related factors are flashing light having a frequency of 10 to 30 Hz, and dense patterns of the recurrence of simple figures. According to the Japanese report, red flashing light is greater than white flashing light in the effect of creating reaction in viewer's brain. A stripe pattern, a polka-dot pattern, a checker pattern, and a scroll pattern are relatively great in the effect of creating reaction in viewer's brain. As the contrast of these patterns increases, the effect of creating reaction in viewer's brain strengthens. The spatial frequency of a simple-figure-recurrence pattern affects the strength of the effect of creating reaction in viewer's brain. Especially, a stripe pattern or a checker pattern having a spatial frequency of 2 to 4 Hz with respect to a visual angle of 1° is considerably great in the effect of creating reaction in viewer's brain.

In the United Kingdom, there are guidance notes to program and sponsor ship codes, "ITC Guidance Note for Licensees on Flashing Images and Regular Patterns in Television". First introduced by the ITC in 1994, the Guidance Note provides licensees with information to help them reduce the risk of television material causing seizures in viewers with photosensitive epilepsy, a condition affecting young people in particular. The ITC held a detailed review of the Guidance Note during 2000, working closely with medical experts and representatives from licensees. The resulting revised Guidance Note was published in July 2001 after having been put out for consultation.

Accordingly, television program producers have recently been required to express pictures in such a way as to be capable of reducing the adverse influence of the expressed pictures on viewer's bodies.

Japanese patent application publication number 2003-157136 discloses a high-presence video display system capable of recording biological reaction of a user. The system in Japanese application 2003-157136 includes a measuring section, a recording section, a judging section, a controlling section, and a display section. The measuring section has a pair of probe electrodes to be attached to the skin of a user. First, the system operates in a registration mode during which the measuring section detects the voltage between the probe electrodes attached to the skin of the user. The detected voltage represents the biological reaction of the user which contains brain waves or electrocardiographic waves. During the registration mode of operation, the user may make prescribed motion or action of user's eyes or muscles. In this case, the detected voltage represents the biological reaction of the user to that motion or action. The recording section stores the detected voltage as an indication of the biological reaction of the user. This operation step corresponds to the registration of the user (the registration of the biological reaction of the user). After the registration mode of operation, a normal mode of operation is implemented. During an initial stage of the normal mode of operation, an identifying procedure is performed. Specifically, the measuring section is activated, and the biological reaction judging section compares the biological reaction represented by the detected voltage currently outputted from the measuring section with the registered biological reaction in the recording section to decide whether or not the present user is the same as the registered user. The controlling section controls the display section in response to the result of this identifying decision.

U.S. Pat. No. 6,212,329 corresponding to Japanese patent application publication number 07-235131/1995 (Japanese patent number 2853727) discloses an apparatus for reproducing an original signal conveyed as main data by a data medium such as a recording disk or a broadcasting system. Medium protection data which are specific to the data medium are conveyed together with the main data. The reproducing apparatus in U.S. Pat. No. 6,212,329 includes a section for generating apparatus protection data specific to the apparatus, a section for combining the apparatus protection data with the medium protection data to define a protection level, and a section for applying the protection level to restrict the reproduction of the original signal. The degree of the restriction is varied in stepwise depending on the protection level. The medium protection data may include information for implementing restricted reproduction of portions of the original signal by providing given regions in specified frames of the original signal with a degraded resolution.

U.S. Pat. No. 6,515,709 discloses an image display apparatus including an extracting unit, a setting unit, a converting unit, and a display unit. The extracting unit extracts, from image information, risk factors harmful to a biological body, that is, the body of a user. The risk factors may be those harmful to persons having photosensitive epilepsy. The risk factors are, for example, a repetitive stimulative image having a frequency higher than 3 Hz, a blurred image, and an oblique-swung image. The setting unit is operated by a user, and sets safety levels for harmful factors in accordance with user's request. The harmful factors correspond to ones selected from the risk factors extracted by the extracting unit. The converting unit changes the harmful factors in the image information to the safety levels to generate conversion-result image information. The change of the harmful factors to the safety levels involves, for example, cutting off a repetitive image having a frequency higher than 3 Hz, reducing the spectrum intensity of a repetitive image having a frequency higher than 3 Hz, reducing the frequency of a 10-Hz or higher repetitive image, and changing the color of a red-based repetitive image having a frequency higher than 3 Hz. The display unit visualizes the conversion-result image information.

Japanese patent application publication number 2004-246725 discloses a display system for indicating 3D contents to a user in an optimal manner. The display system in Japanese application 2004-246725 controls the display conditions of 3D contents in response to prescribed factors. The controlled display conditions include the brightness, the contrast, the display rate, and the depth-related condition. The prescribed factors include the degree of the biological influence of indicated 3D contents on a viewer, the degree of viewer's feeling of physical disorder caused by indicated 3D contents, and the viewer's resistivity to indicated 3D contents. In Japanese application 2004-246725, a combination of 3D contents and accessory information related to the 3D contents is transmitted from a server of a contents producer side to the display system. The accessory information represents the attributes of the 3D contents, for example, the frame size, the luminance, the contrast, and the depth-related condition of the 3D contents. The accessory information also represents standard attribute values (average attribute values) corresponding to the respective contents attributes. The display system calculates the degree of the biological influence of indicated 3D contents on a viewer from the differences between the standard attribute values and the contents attributes which are represented by the transmitted accessory information. The display system controls the display conditions of the 3D contents in response to the calculated influence degree.

SUMMARY OF THE INVENTION

It is a first object of this invention to provide an improved apparatus for processing two-dimensional (2D) or three-dimensional (3D or stereoscopic) video data to make indicated contents safe for viewers.

It is a second object of this invention to provide an improved 2D, 3D, or stereoscopic picture reproducing apparatus which can make indicated contents safe for viewers.

It is a third object of this invention to provide an improved computer program for processing video data such as 2D, 3D, or stereoscopic video data to make indicated contents safe for viewers.

It is a fourth object of this invention to provide an improved computer program for reproducing 2D, 3D, or stereoscopic pictures which can make indicated contents safe for viewers.

It is a fifth object of this invention to provide an improved method of processing video data such as 2D, 3D, or stereoscopic video data to make indicated contents safe for viewers.

It is a sixth object of this invention to provide an improved method of reproducing 2D, 3D, or stereoscopic pictures which can make indicated contents safe for viewers.

It is a seventh object of this invention to provide an improved recording medium storing video data such as 2D, 3D, or stereoscopic video data.

A first aspect of this invention provides a video data processing apparatus comprising first means for analyzing every prescribed unit of video data to estimate a degree of influence of pictures represented by every prescribed unit of video data on a viewer; second means for generating information representing the influence degree estimated by the first means; and third means for outputting every prescribed unit of video data and the information generated by the second means while relating every prescribed unit of video data and the information generated by the second means to each other.

A second aspect of this invention provides a video data processing apparatus comprising first means for analyzing every prescribed unit of three-dimensional video data to estimate a degree of influence of a depth in three-dimensional pictures represented by every prescribed unit of three-dimensional video data on a viewer; second means for generating information representing the influence degree estimated by the first means; and third means for outputting every prescribed unit of three-dimensional video data and the information generated by the second means while relating every prescribed unit of three-dimensional video data and the information generated by the second means to each other.

A third aspect of this invention provides a picture reproducing apparatus comprising first means for obtaining an estimated degree of influence of pictures represented by every prescribed unit of video data on a viewer; second means for setting an allowable range with respect to the estimated influence degree obtained by the first means; third means for deciding whether the estimated influence degree obtained by the first means is within or outside the allowable range set by the second means; and fourth means for reducing an actual degree of influence of pictures represented by every prescribed unit of video data on the viewer when the third means decides that the estimated influence degree is outside the allowable range.

A fourth aspect of this invention provides a picture reproducing apparatus comprising first means for obtaining an estimated degree of influence of a depth in pictures represented by every prescribed unit of three-dimensional video data on a viewer; second means for setting an allowable range with respect to the estimated influence degree obtained by the first means; third means for deciding whether the estimated influence degree obtained by the first means is within or outside the allowable range set by the second means; and fourth means for reducing an actual degree of influence of the depth in the pictures represented by every prescribed unit of three-dimensional video data on the viewer when the third means decides that the estimated influence degree is outside the allowable range.

A fifth aspect of this invention provides a program for enabling a computer to implement a method comprising the steps of analyzing every prescribed unit of video data to estimate a degree of influence of pictures represented by every prescribed unit of video data on a viewer; generating information representing the estimated influence degree; and outputting every prescribed unit of video data and the generated information while relating every prescribed unit of video data and the generated information to each other.

A sixth aspect of this invention provides a program for enabling a computer to implement a method comprising the steps of analyzing every prescribed unit of three-dimensional video data to estimate a degree of influence of a depth in three-dimensional pictures represented by every prescribed unit of three-dimensional video data on a viewer; generating information representing the estimated influence degree; and outputting every prescribed unit of three-dimensional video data and the generated information while relating every prescribed unit of three-dimensional video data and the generated information to each other.

A seventh aspect of this invention provides a program for enabling a computer to implement a method comprising the steps of obtaining an estimated degree of influence of pictures represented by every prescribed unit of video data on a viewer; setting an allowable range with respect to the estimated influence degree; deciding whether the estimated influence degree is within or outside the allowable range; and reducing an actual degree of influence of pictures represented by every prescribed unit of video data on the viewer when it is decided that the estimated influence degree is outside the allowable range.

An eighth aspect of this invention provides a program for enabling a computer to implement a method comprising the steps of obtaining an estimated degree of influence of a depth in pictures represented by every prescribed unit of three-dimensional video data on a viewer; setting an allowable range with respect to the estimated influence degree; deciding whether the estimated influence degree is within or outside the allowable range; and reducing an actual degree of influence of the depth in the pictures represented by every prescribed unit of three-dimensional video data on the viewer when it is decided that the estimated influence degree is outside the allowable range.

A ninth aspect of this invention provides a method of processing video data. The method comprises the steps of analyzing every prescribed unit of video data to estimate a degree of influence of pictures represented by every prescribed unit of video data on a viewer; generating information representing the estimated influence degree; and outputting every prescribed unit of video data and the generated information while relating every prescribed unit of video data and the generated information to each other.

A tenth aspect of this invention provides a method of processing video data. The method comprises the steps of analyzing every prescribed unit of three-dimensional video data to estimate a degree of influence of a depth in three-dimensional pictures represented by every prescribed unit of three-dimensional video data on a viewer; generating information representing the estimated influence degree; and outputting every prescribed unit of three-dimensional video data and the generated information while relating every prescribed unit of three-dimensional video data and the generated information to each other.

An eleventh aspect of this invention provides a method of reproducing pictures. The method comprises the steps of obtaining an estimated degree of influence of pictures represented by every prescribed unit of video data on a viewer; setting an allowable range with respect to the estimated influence degree; deciding whether the estimated influence degree is within or outside the allowable range; and reducing an actual degree of influence of pictures represented by every prescribed unit of video data on the viewer when it is decided that the estimated influence degree is outside the allowable range.

A twelfth aspect of this invention provides a method of reproducing pictures. The method comprises the steps of obtaining an estimated degree of influence of a depth in pictures represented by every prescribed unit of three-dimensional video data on a viewer; setting an allowable range with respect to the estimated influence degree; deciding whether the estimated influence degree is within or outside the allowable range; and reducing an actual degree of influence of the depth in the pictures represented by every prescribed unit of three-dimensional video data on the viewer when it is decided that the estimated influence degree is outside the allowable range.

A thirteenth aspect of this invention provides a recording medium storing video data and contents biological influence level information, the contents biological influence level information representing a degree of influence of pictures represented by every prescribed unit of the video data on a viewer which has been estimated by analyzing every prescribed unit of the video data, every prescribed unit of the stored video data and the stored contents biological influence level information being related to each other.

A fourteenth aspect of this invention provides a recording medium storing three-dimensional video data and contents biological influence level information, the contents biological influence level information representing a degree of influence of a depth in three-dimensional pictures represented by every prescribed unit of the three-dimensional video data on a viewer which has been estimated by analyzing every prescribed unit of the three-dimensional video data, every prescribed unit of the stored three-dimensional video data and the stored contents biological influence level information being related to each other.

This invention has advantages as follows. The playback of 2D or 3D pictures can be properly controlled in consideration for the influence of the pictures on the biological body of a viewer. Furthermore, 2D or 3D pictures can be presented in a fashion safe to a viewer. In addition, 2D or 3D pictures can be presented safely and properly in view of the age of a viewer or the condition of viewer's health.

BRIEF DESCRIPTION OF THE DRAWINGS

FIG. 2 is a diagram showing a prior-art relation between the attributes of video contents and the level (degree) of the influence of the video contents on viewer's body.

FIG. 10 is a diagram of an example of the structure of one unit (one VOBU) in the first embodiment of this invention.

FIG. 11 is a time-domain diagram showing a first example of a sequence of units of data to be recorded in the first embodiment of this invention.

FIG. 12 is a time-domain diagram showing a second example of a sequence of units of data to be recorded in the first embodiment of this invention.

FIG. 16 is a diagram showing a reference table in the third embodiment of this invention.

FIG. 28 is a diagram showing a reference table in the ninth embodiment of this invention.

DETAILED DESCRIPTION OF THE INVENTION

Prior-art documents and materials will be explained below for a better understanding of this invention.

Figure 1:
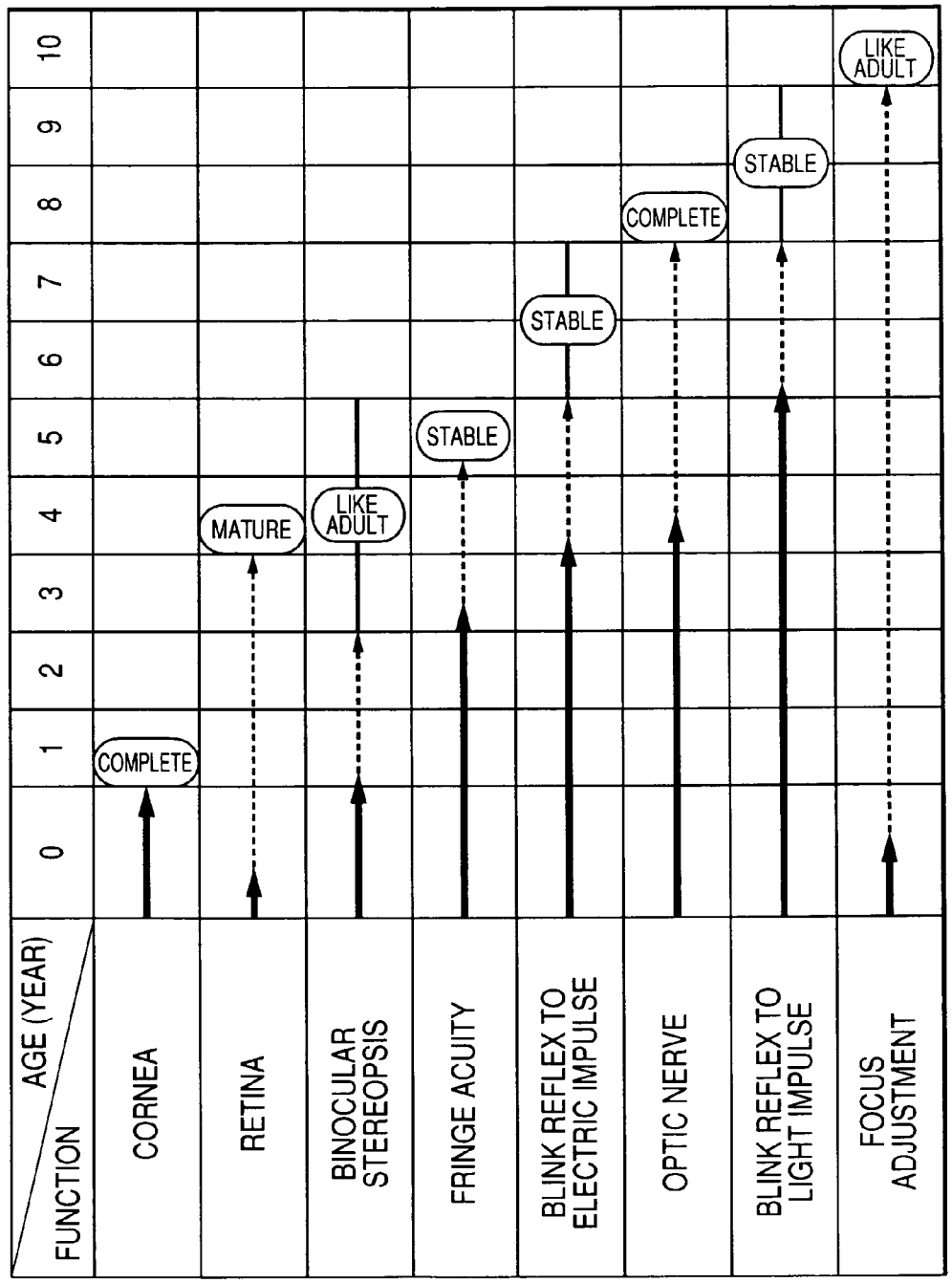
FIG. 1 is a diagram showing the conditions of the typical growth of the cornea, the retina, the stereopsis, the fringe acuity, the blink reflex to an electrical impulse, the optic nerve, the blink reflex to a light impulse, and the focus adjustment in children 0 to 10 years old.
Figure 3:
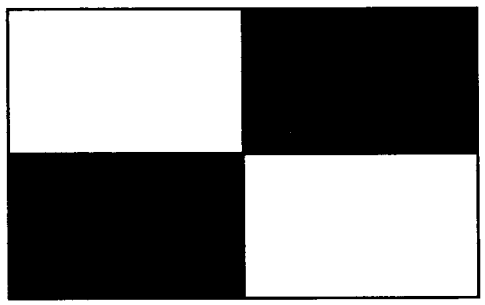
FIGS. 3, 4, 5, and 6 are plan views of prior-art black-and-white patterns occupied by high contrast regions at 100%.
Figure 4:
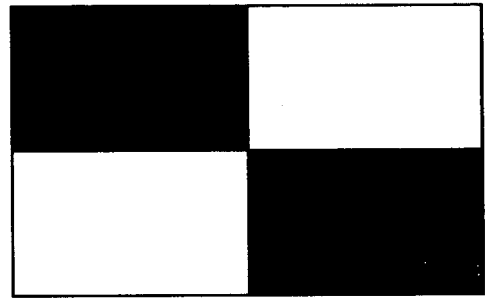
Figure 5:
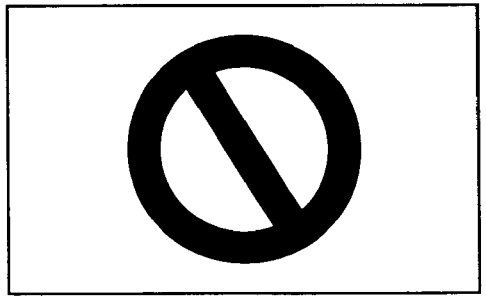
Figure 6:
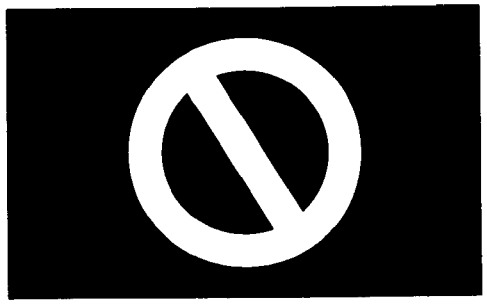

Japanese proposed guidelines on 3D pictures, "Feasibility Study on Development of System for Generally Assessing Influence of 3D pictures on Human Body", published by the Machine System Promotion Society in July 2002, disclose the conditions of the typical growth of the cornea, the retina, the binocular stereopsis, the fringe acuity, the blink reflex to an electric impulse, the optic nerve, the blink reflex to a light impulse, and the focus adjustment in children 0 to 10 years old. FIG. 1 shows the disclosed growth conditions. As shown in FIG. 1, there are stages during which some of the functions actively grow and stages during which they grow not so actively.

FIG. 2 shows the prior-art relation between the attributes of video contents and the level (degree) of the influence of the video contents on viewer's body. In FIG. 2, the attributes of video contents include the ratio in area of a high contrast region to an entire picture, the flashing temporal frequency, the convergence angle for binocular stereopsis, and the spatial frequency of the recurrence of a simple figure in an entire picture. Basically, the levels of the influence in FIG. 2 are estimated degrees of the influence on a typical viewer.

FIGS. 3, 4, 5, and 6 show prior-art black-and-white patterns occupied by high contrast regions at 100%. The above-indicated Japanese proposed guidelines recommend that the ratio in area of a high contrast region to an entire picture should be less than 20%. Accordingly, the ratio in area of a high contrast region to an entire picture which corresponds to the "6" or higher level of the influence of the video contents on viewer's body seems harmful to viewer's body (see FIG. 2).

The above-indicated Japanese proposed guidelines point out that a flashing temporal frequency of 5 Hz or higher is harmful to viewer's body. In FIG. 2, a flashing temporal frequency of 5 Hz or higher corresponds to the "4" or higher level of the influence of the video contents on viewer's body. In an NTSC system, the frame frequency is 29.97 Hz so that the flashing temporal frequency will not exceed 29.97 Hz.

Figure 7:
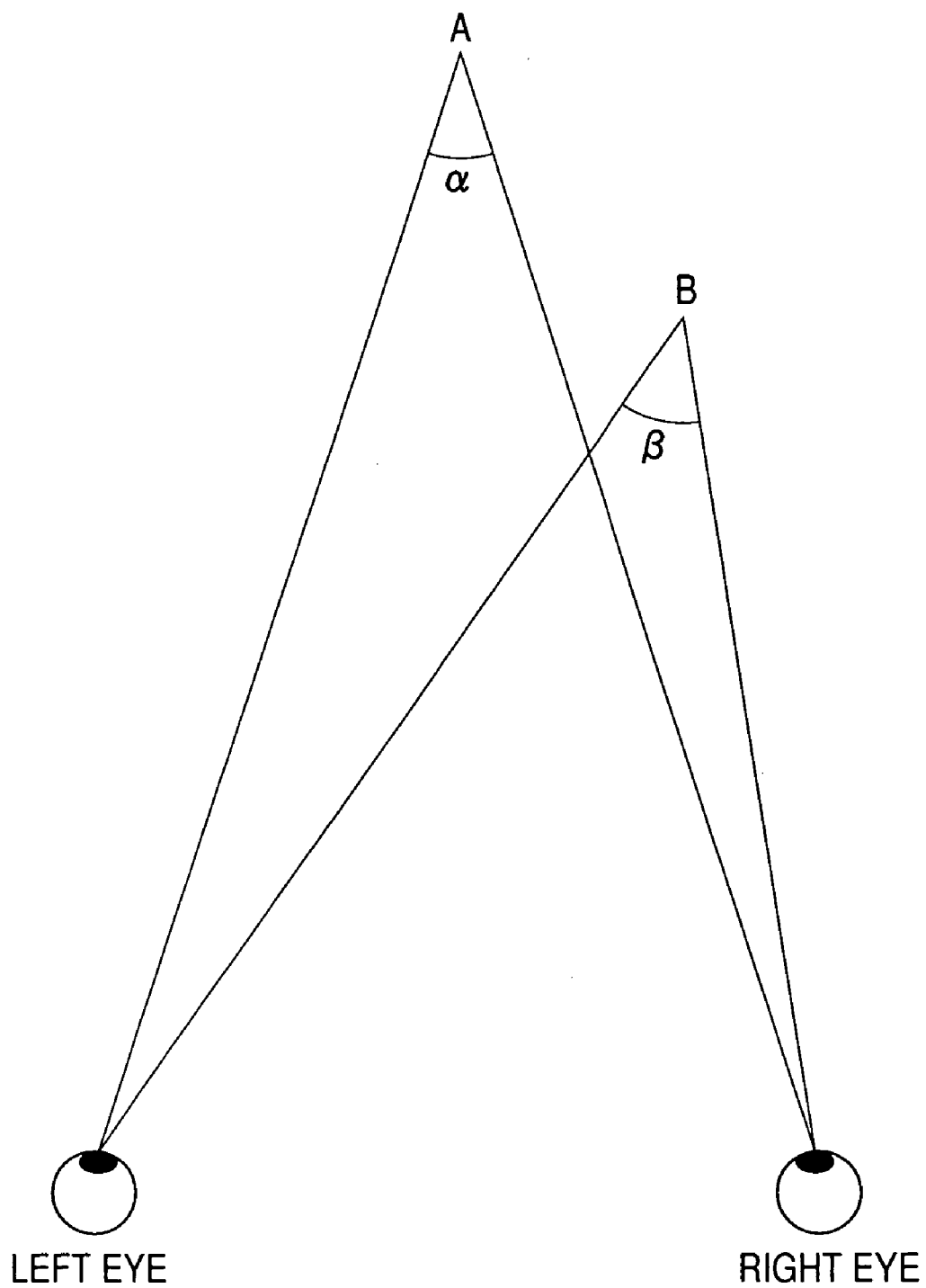
FIG. 7 is a diagram of the relation between the convergence angle and the position of an observed point.

The convergence angle is formed between the line connecting viewer's left-hand eye and a point observed by the viewer and the line connecting viewer's right-hand eye and the observed point. With reference to FIG. 7, the convergence angle for an observed point "A" is denoted by "α", and the convergence angle for an observed point "B" is denoted by "β". The convergence angle decreases as the observed point moves away from the viewer.

The above-indicated Japanese proposed guidelines point out that a convergence angle of 34 minutes or more for binocular stereopsis is harmful to viewer's body. In FIG. 2, a convergence angle of 34 minutes or more corresponds to the "8" or higher level of the influence of the video contents on viewer's body.

It is known that a black-and-white stripe pattern having a spatial frequency of 1 to 5 cpd (cycle per degree, that is, the number of pairs of black and white stripes per unit angle) affects a viewer's body. A spatial frequency of 1 to 5 cpd corresponds to an on-screen stripe width of 0.4 to 2 cm in the case where a viewer is about 2 meters away from a television display. Basically, it should be thought that a spatial frequency of 1 cpd or more is harmful to viewer's body. On the other hand, it is thought that a spatial frequency of 6 cpd or more is safe since the resolution of a standard television display can not follow the spatial frequency.

First Embodiment

Figure 8:
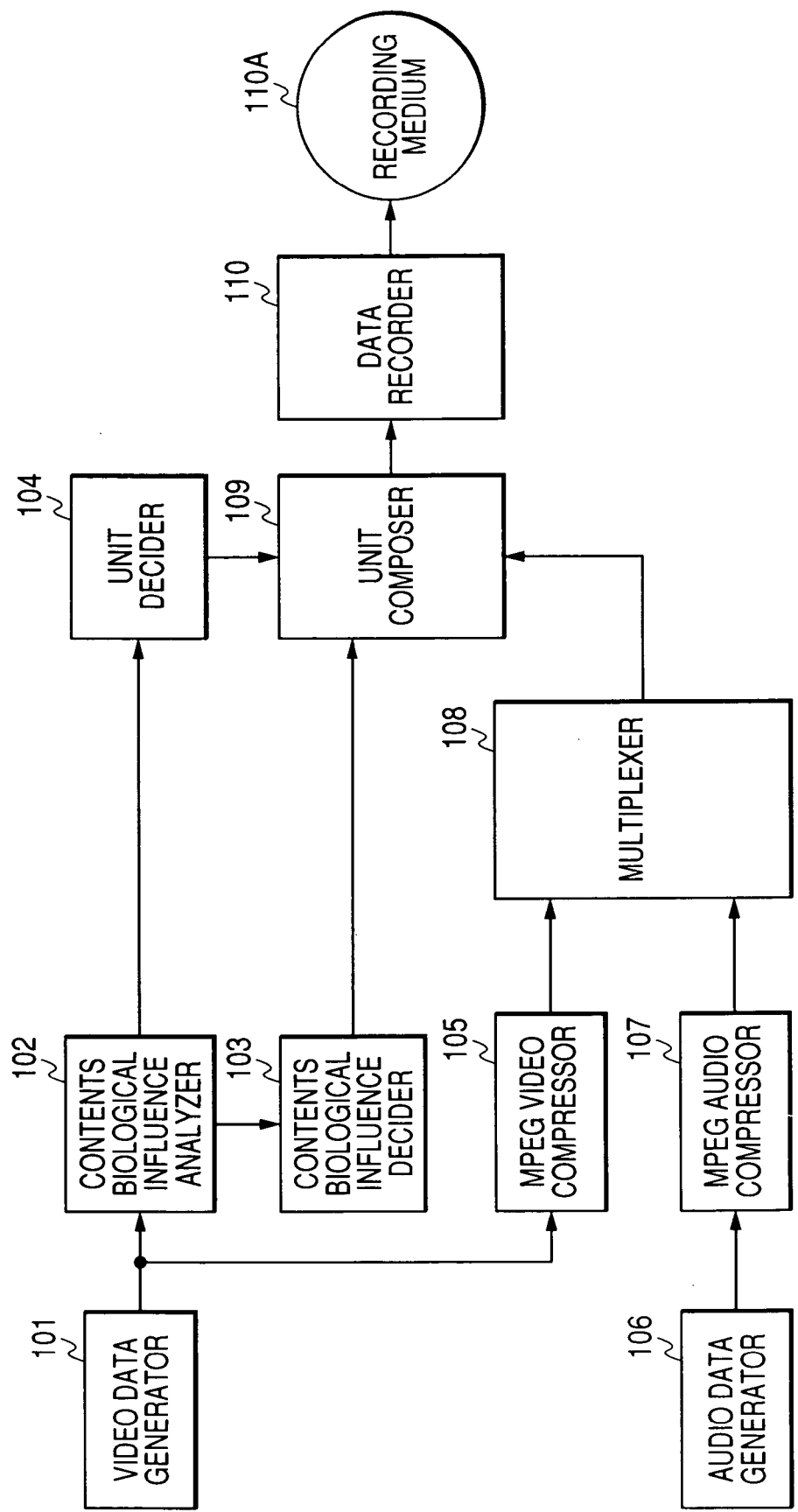
FIG. 8 is a block diagram of a video data recording apparatus according to a first embodiment of this invention.

FIG. 8 shows a video data recording apparatus according to a first embodiment of this invention. The video data recording apparatus includes a video data processing apparatus.

The apparatus of FIG. 8 includes a video data generator 101, a contents biological influence analyzer 102, a contents biological influence decider 103, a unit decider 104, an MPEG (Moving Picture Experts Group) video compressor 105, an audio data generator 106, an MPEG audio compressor 107, a multiplexer 108, a unit composer 109, and a data recorder 110. The data recorder 110 can access a recording medium The video data generator 101 is connected with the contents biological influence analyzer 102 and the MPEG video compressor 105. The contents biological influence analyzer 102 is connected with the contents biological influence decider 103 and the unit decider 104. The contents biological influence decider 103 and the unit decider 104 are connected with the unit composer 109. The MPEG video compressor 105 is followed by the multiplexer 108. The audio data generator 106 is successively followed by the MPEG audio compressor 107 and the multiplexer 108. The multiplexer 108 is connected with the unit composer 109. The unit composer 109 is followed by the data recorder 110. The data recorder 110 can act on the recording medium 110A. The recording medium 110A is, for example, a DVD (digital versatile disc).

The generator 101 produces video data. The generator 101 may utilize a CG (computer graphics) system for generating video data. Alternatively, the generator 101 may include a device for reading out video data from a recording medium before outputting the read-out video data. The generator 101 feeds the produced video data to the analyzer 102 and the compressor 105.

The device 102 analyzes the contents of the video data fed from the generator 101 in respect to how degree the contents affect a biological body (user's body). In the case where the video data represents 2D (two-dimensional) pictures, the device 102 analyzes the contents of the video data to detect the ratio in area of a high contrast region to every entire picture, the flashing temporal frequency of blinking pictures, and the spatial frequency of the recurrence of a simple figure in every entire picture. In the case where the video data represents virtual 3D (three-dimensional) pictures, the device 102 analyzes the contents of the video data to detect the quantity of the binocular parallax having a correlation with the convergence angle. In the case where the video data represents binocular stereoscopic pictures, the device 102 analyzes the contents of the video data to detect the difference between left-hand and right-hand pictures of the same texture.

Thus, the device 102 analyzes the contents of the video data in respect to each of the items in the attributes of the contents which are the ratio in area of a high contrast region to an entire picture, the flashing temporal frequency, the convergence angle for binocular stereopsis, and the spatial frequency of the recurrence of a simple figure in an entire picture. The analyzer 102 notifies the results of the analysis (the results of the detection) to the decider 103. The analyzer 102 passes the video data to the decider 104.

The device 102 may also analyze the contents of the video data in respect of each of other items in the attributes of the contents which are, for example, the picture resolution, the flicker in pictures, and the distortion in pictures.

The decider 103 includes a memory loaded with table information (or map information) representing a predetermined relation between detected values of the items in the attributes of video contents and an estimated level (degree) of the influence of the video contents on a biological body, that is, viewer's body. According to the predetermined relation, the contents biological influence level (the level of the influence of video contents on a biological body) changes as the detected value of each of the items in the attributes of the video contents varies. The predetermined relation may be similar to that in FIG. 2. According to an example of the predetermined relation, the contents biological influence level increases stepwise from "1" to "8" through "2", "3", "4", "5", "6", and "7" as the detected value of each of the items in the attributes of the video contents rises (see FIG. 2). The decider 103 receives, from the analyzer 102, the detected values of the items in the attributes of the video contents. The device 103 decides the contents biological influence level in response to at least one of the detected values of the items in the attributes of the video contents by referring to the predetermined relation represented by the table information. Preferably, the device 103 decides the contents biological influence level for every fixed-length time segment of the video contents or for every scene in the video contents. Alternatively, the device 103 may decide the contents biological influence level for every arbitrary-length time segment of the video contents or for every arbitrary scene in the video contents. Thus, the decided contents biological influence level can be updated time to time. The decider 103 feeds information representative of the decided contents biological influence level to the composer 109.

In summary, the analyzer 102 and the decider 103 cooperate to analyze the video data to estimate the degree of the influence of pictures represented by the video data on the biological body.

The decider 104 receives the video data from the analyzer 102. The device 104 decides or detects every basic interval related to the received video data. The basic interval corresponds to, for example, one GOP (group of pictures) in the case where the video data is of the MPEG format. The basic interval is, for example, a time of 0.4 second to 1.0 second which is defined by one VOBU (video object unit) composed of several GOPs in the case where the video data is of the DVD format. The decider 104 generates an instruction signal indicating every boundary between the decided basic intervals. The decider 104 feeds the generated instruction signal (the interval boundary signal) to the composer 109. Every decided basic interval is defined as a unit interval related to the video data. Thus, the decider 104 feeds information indicative of every decided unit interval to the composer 109.

The compressor 105 receives the video data from the generator 101. The device 105 compresses the received video data into MPEG video data by implementing the signal processing for MPEG video compression. The compressor 105 feeds the MPEG video data to the multiplexer 108. Preferably, the MPEG video data is in the form of a bit stream.

The generator 106 produces audio data. The generator 106 may utilize a system for generating audio data. Alternatively, the generator 106 may include a device for reading out audio data from a recording medium before outputting the read-out audio data. The generator 106 feeds the produced audio data to the compressor 107.

The device 107 compresses the audio data from the generator 106 into MPEG audio data by implementing the signal processing for MPEG audio compression. The compressor 107 feeds the MPEG audio data to the multiplexer 108. Preferably, the MPEG audio data is in the form of a bit stream.

The multiplexer 108 receives the MPEG video data and the MPEG audio data from the compressors 105 and 107. The device 108 multiplexes the MPEG video data and the MPEG audio data into MPEG multiplexed audio-visual data according to the MPEG system standards. The multiplexer 108 feeds the MPEG multiplexed audio-visual data to the composer 109. Preferably, the MPEG multiplexed audio-visual data is in the form of a bit stream.

The MPEG system standards prescribe a method of multiplexing a plurality of MPEG bit streams, which include an MPEG bit stream of MPEG video data and an MPEG bit stream of MPEG audio data, into one composite MPEG bit stream, and also a method of reproducing a composite MPEG bit stream while maintaining synchronization. The multiplexing in conformity with the MPEG system standards is designed as follows. For example, in the case where video data and audio data are handled, the video data and the audio data are divided into time segments having a suitable length. Additional information and each of the time segments of the video data and the audio data are combined to form a packet. The additional information occupies a head of the packet, and forms a packet header. Each packet header (additional information) includes information indicating which of the video data and the audio data the related packet is loaded with, and time-related information for synchronization. The video data packets and the audio data packets are suitably arranged before being transmitted on a time sharing basis. The DVD standards prescribe that the length of every packet is 2 KB in correspondence with the length of sectors on a DVD.

The composer 109 receives the MPEG multiplexed audio-visual data, the contents biological influence level information, and the instruction signal from the multiplexer 108, the decider 103, and the decider 104, respectively. The composer 109 makes or processes the video data and the audio data in the MPEG multiplexed audio-visual data, and the contents biological influence level information into a sequence of units (for example, VOBUs) in response to the instruction signal. Specifically, the composer 109 makes or processes the video data and the audio data in the MPEG audio-visual data into a sequence of units, and allows the contents biological influence level information to be described in each of the units in response to the instruction signal. The composer 109 outputs the sequence of units of data to the recorder 110.

The device 110 records the sequence of units of data on the recording medium 110A. Preferably, the data recording on the recording medium 110A is implemented by a block by block basis. For example, in the case where the recording medium 110A is a DVD, the data recording is implemented 2 KB by 2 KB. Every 2-KB data block corresponds to one sector on the DVD.

It should be noted that a sending device connected with the composer 109 may be provided. The sending device receives the sequence of units of data from the composer 109. The sending device converts the sequence of units of data into a stream of packets designed for communications or broadcasting. The sending device outputs the stream of packets to a communication-network transmission line or a broadcasting transmission line.

As previously mentioned, the contents biological influence level information is described in each of the units of the video data and the audio data. A signal format is used which enables such description of the contents biological influence level information.

Figure 9:
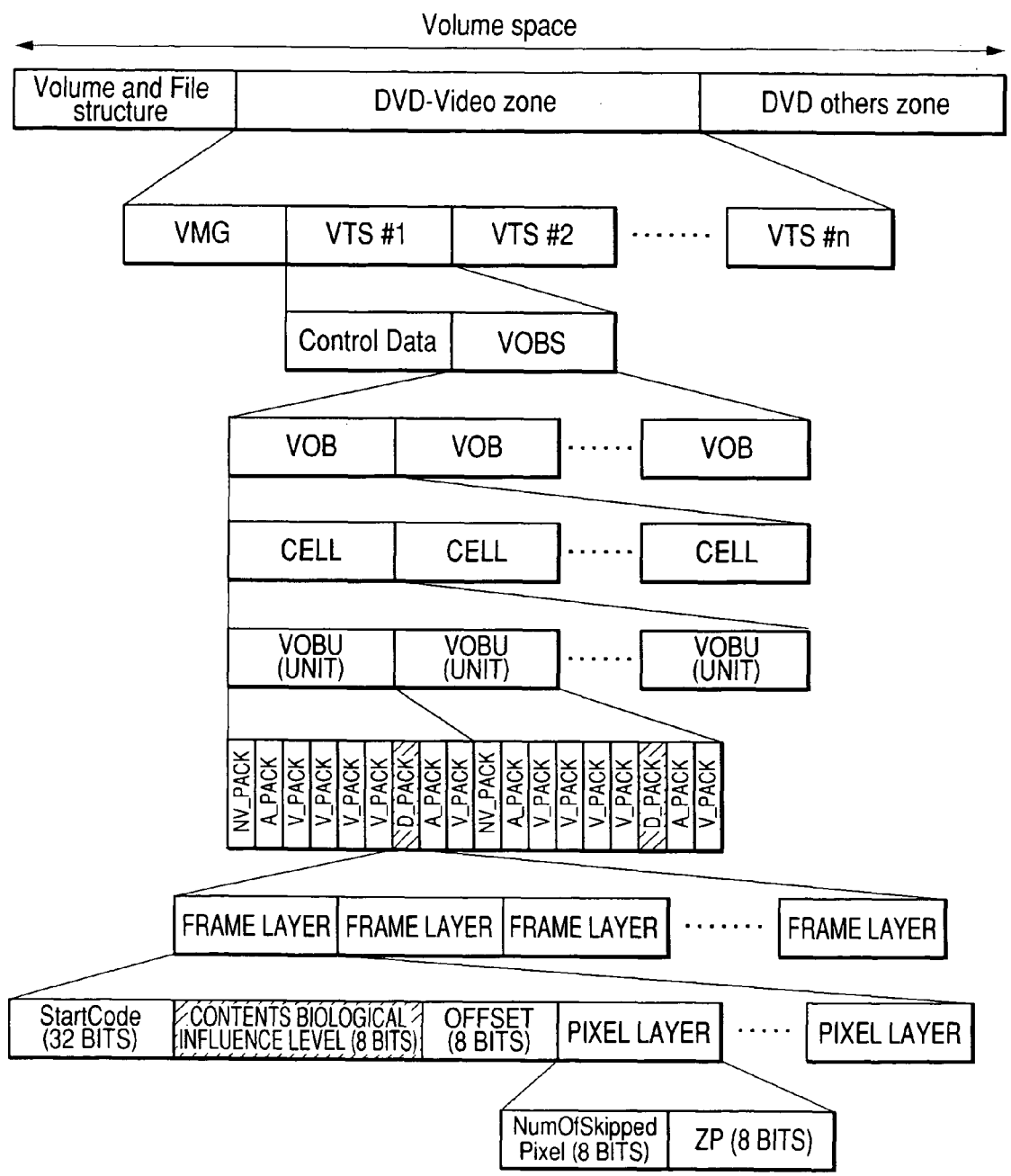
FIG. 9 is a diagram showing an example of the format of recorded data in the first embodiment of this invention.

FIG. 9 shows an example of the signal format. The signal format in FIG. 9 conforms with the DVD-Video standards, and suits to the data recording on a DVD-Video. Thus, the signal format in FIG. 9 is a recorded data format. According to the recorded data format in FIG. 9, the contents biological influence level information is stored in a DVD-Video zone prescribed by the DVD-Video standards.

With reference to FIG. 9, the volume space (the recording layer) in a recording medium, that is, a DVD-Video, is divided into a volume and file structure, a DVD-Video zone, and a DVD others zone. The volume and file structure is a zone storing a file system. The DVD-Video zone stores main data such as video data. The DVD others zone stores additional information which can be used by, for example, a personal computer.

A video manager (VMG) and video title sets (VTS#1, VTS#2, . . . , and VTS#n) are placed in the DVD-Video zone. Video manager information is described in the VMG. The video manager information includes identification information for the succeeding VTSs, the start addresses and the end address of various information materials, and information indicating a place from which the playback of a video stream should be started. Control data (VTSI or video title set information) and a video object set (VOBS) are located in each of the VTSs. The control data includes identification information and address information for video data and audio data to be played back. The VOBS is loaded with an MPEG multiplexed audio-visual data stream.

The VOBS consists of video objects (VOBs) which are MPEG streams in small units. Each of the VOBs is divided into segments called "CELL". One CELL consists of video object units (VOBUs) each approximately corresponding to one group of pictures (GOP) in the MPEG stream. Each VOBU has a time length of about 0.4 to 1.0 second. Each VOBU consists of packs including one navigation pack (NV_PACK), video packs (V_PACKs), audio packs (A_PACKs), and at least one depth-perception pack (D_PACK). Every pack has a header loaded with pack ID (identification) information and other information prescribed by the MPEG standards. The NV_PACK occupies the head of the related VOBU, and stores stream search information. The V_PACKs store compressed video data. The A_PACKs store compressed audio data. The stream search information in the NV_PACK, the compressed video data in the V_PACKs, and the compressed audio data in the A_PACKs are multiplexed on the MPEG basis.

The D_PACK stores the contents biological influence level information and also depth information (depth-perception information) peculiar to 3D pictures. The stream search information in the NV_PACK, the compressed video data in the V_PACKs, the compressed audio data in the A_PACKs, and the contents biological influence level information and also the depth information in the D_PACK are multiplexed on the MPEG basis in a fashion conforming with the DVD-Video standards.

The D_PACK consists of a plurality of frame layers. The head of each of the frame layers is occupied by a 32-bit start code signal which starts from, for example, "000001FF" in hexadecimal notation. The start code signal is chosen from predetermined special signals which can be discriminated in logic state from all of possible data pieces generated by the MPEG encoding inclusive of run length encoding, DCT (discrete cosine transform) encoding, and VLC (variable length code) encoding.

The start code signal is followed by 8 bits assigned to the contents biological influence level information and hence representing the contents biological influence level. For example, in the case where the contents biological influence level can change among "1", "2", "3", "4", "5", "6", "7", and "8" as shown in FIG. 2, 3 bits among the 8 bits are used to indicate the contents biological influence level. In this case, the 5 remaining bits are reserved, and a logic state of "0" is described therein. On the other hand, in the case where all the 8 bits are used, the contents biological influence level represented by them can change among up to 256 different values.

The contents biological influence level information is followed by an 8-bit offset signal. The offset signal is designed to provide each 1-pixel-corresponding piece of the depth information with an offset which can change among 256 different values from "−128" to "+127". In the event that a depth information piece occurring after having the offset will move out of the range from "0" to "255", a limiter is utilized or a limiting process is implemented to confine the depth information piece within an 8-bit width.

The offset signal is followed by 16-bit pixel layers. Normally, pieces of the depth information which are assigned to respective pixels are described in the respective pixel layers in the raster order. Each depth information piece represents one selected among 256 different values from "−128" to "+127". In the event that depth information pieces having the same value successively occur, 8 former bits in a pixel layer corresponding to first one of the depth information pieces are used to indicate the number of the depth information pieces (that is, the number of times of the successive and repetitive occurrence of the same-value depth information piece or the number of skipped pixels) while 8 later bits ZP therein are used to represent the depth information piece. In this case, pixel layers corresponding to second and later ones of the depth information pieces are omitted so that only the pixel layer corresponding to first one of the depth information pieces will be transmitted. For example, in the case where a depth information piece having a value of "100" repetitively occurs 4 times, 8 former bits in a pixel layer corresponding to the first-occurring depth information piece are set to indicate a number of 4 while 8 later bits ZP therein are set to represent the depth information piece. In this case, the depth information piece having a value of "100" is not repetitively transmitted, and only the first-occurring depth information piece is transmitted. The value represented by the depth information piece ZP is variable among 256 different values from "−128" to "+127".

FIG. 10 shows another example of the structure of one unit (one VOBU). With reference to FIG. 10, one unit consists of an NV_PACK, an audio zone, a video zone, and a D_PACK which are successively arranged in that order. The audio zone is occupied by one or more A_PACKs. The video zone is occupied by one or more V_PACKs. The D_PACK stores the contents biological influence level information for video data in the related unit (the related VOBU). Accordingly, the contents biological influence level information which has been generated for video data assigned to each unit (each VOBU) is placed in the same unit. Thus, the contents biological influence level information and the video data which are related to each other are contained in a same unit-corresponding segment of data to be recorded.

It should be noted that the contents biological influence level information may be placed in the MPEG bit stream without using a D_PACK. For example, the contents biological influence level information is described in user data areas in picture layers of the MPEG bit stream. This design is useful in the case where data to be recorded represents 2D pictures rather than 3D pictures and does not need to have depth information.

According to the MPEG data compression standards, user data areas are provided in GOP layers in addition to picture layers. The user data areas are defined by the MPEG syntax, and are allowed to store arbitrary information or data unrelated to video and audio. Examples of the user data areas are prescribed areas named "user_data" and "private_data_byte", or data packets named "private_stream" which can be arbitrarily set by a user. As previously mentioned, the contents biological influence level information may be described in the user data areas.

The MPEG1 video standards prescribe that in a portion of a picture layer which precedes a slice layer, user data ("user_data") can be recorded in unit of 8 bits at a place after a start code signal "user_data_start_code". The start code signal "user_data_start_code" is defined as one having a logic state of "0x000001B2". After the start code signal "user_data_start_code", a uniquely-identifiable code signal is placed and then arbitrary information (for example, the contents biological influence level information) is recorded in a user data area as user information. The uniquely-identifiable code signal is designed to indicate the presence of the user information and allow the detection or identification thereof. The uniquely-identifiable code signal has a logic state of, for example, "0x0f0f0f0f2428fdaa". For use by another application, the user information (for example, the contents biological influence level information) can be detected or identified in response to the uniquely-identifiable code signal.

In a system layer of a multiplexed transport stream of MPEG2 or other MPEGs, a flag signal "transport rivate data flag" which is set to "1" indicates the presence of arbitrary user information "private_data". The user information "private_data" may include the contents biological influence level information. The user information has a length represented by a data segment "transport_private_data_length". The length of the user information is limited so that the related transport packet will not overflow.

The MPEG system standards prescribe methods of handling user data. For example, when a signal "private_stream" is set in a data segment "stream_id", exclusive packets for user data can be provided. The contents biological influence level information may be placed in the user data.

One of the above-mentioned methods places the contents biological influence level information in the prescribed region or regions in the multiplexed audio-visual signal recorded on the recording medium.

With reference to FIG. 11, there is a sequence of units of the data to be recorded (the data outputted from the composer 109). In FIG. 11, information representing a contents biological influence level of "3" is placed in a first unit, and the contents biological influence level "3" is set for contents data located in the first unit. Information representing a contents biological influence level of "4" is placed in a second unit, and the contents biological influence level "4" is set for contents data located in the second unit. Information representing a contents biological influence level of "5" is placed in a third unit, and the contents biological influence level "5" is set for contents data located in the third unit. Information representing a contents biological influence level of "4" is placed in a fourth unit, and the contents biological influence level "4" is set for contents data located in the fourth unit. Thus, the contents biological influence level information and the contents data inclusive of the MPEG video data and the MPEG audio data are multiplexed before being recorded on the recording medium 110A.

As shown in FIG. 12, a same playback timing may be assigned to a plurality of units of data to be recorded (the data outputted from the composer 109). In FIG. 12, regarding a certain scene in video contents, a same playback timing is assigned to 1) a unit having contents data and information representing a contents biological influence level of "3" for the contents data, 2) a unit having contents data and information representing a contents biological influence level of "4" for the contents data, 3) a unit having contents data and information representing a contents biological influence level of "5" for the contents data, and 4) a unit having contents data and information representing a contents biological influence level of "6" for the contents data.

As understood from the above description, the contents biological influence level information indicates the possibility of the influence of related pictures on the biological body of a viewer. The biological influence level information, the video data, and the audio data can be multiplexed on a scene-by-scene basis.

Second Embodiment

Figure 13:
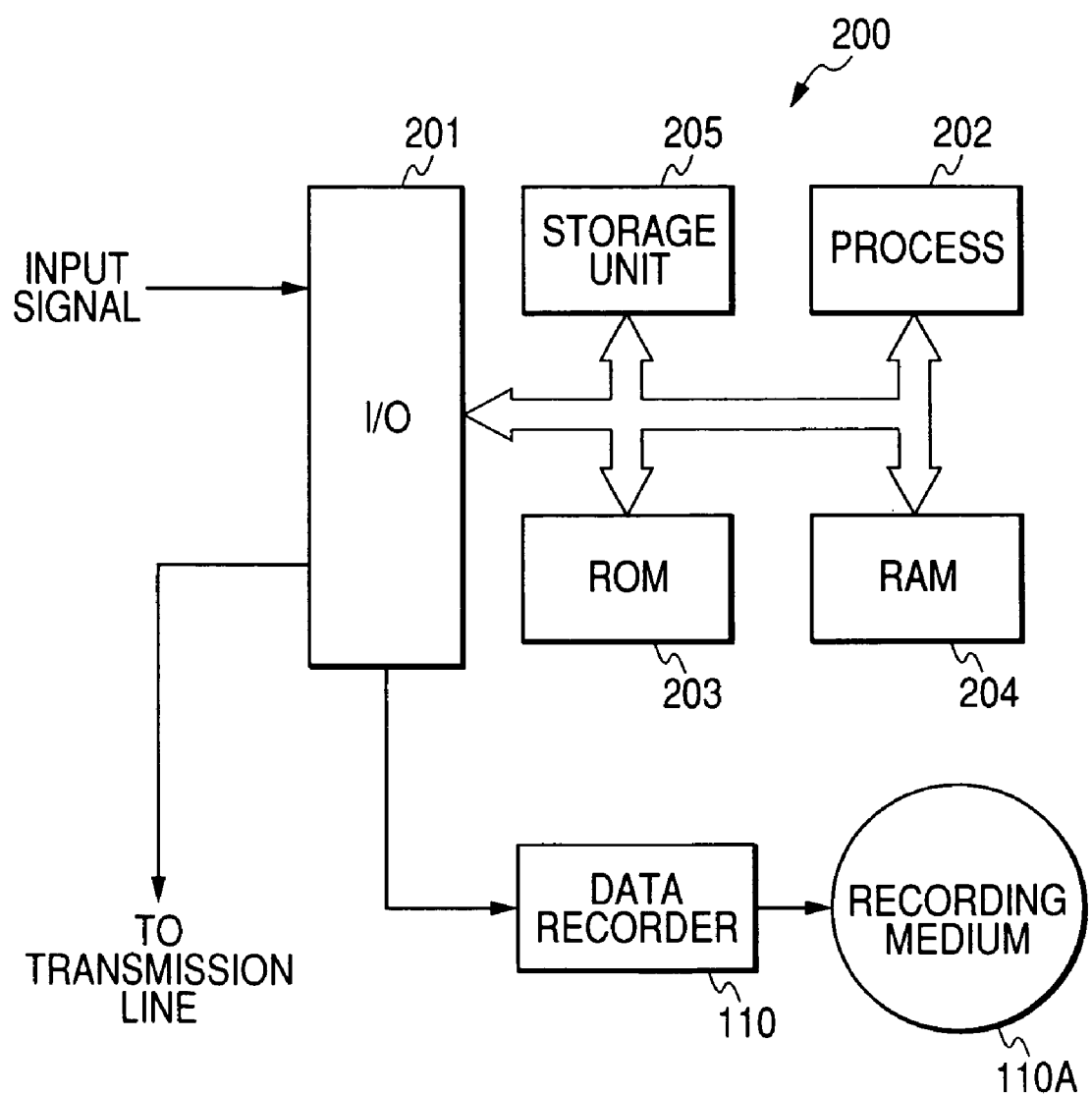
FIG. 13 is a block diagram of a video data recording apparatus according to a second embodiment of this invention.

FIG. 13 shows a video data recording apparatus according to a second embodiment of this invention. The video data recording apparatus in FIG. 13 is similar to that in FIG. 8 except for design changes mentioned hereafter.

The video data recording apparatus in FIG. 13 includes a computer system 200 having a combination of an I/O circuit 201, a processing section 202, a ROM 203, a RAM 204, and a storage unit 205. The computer system 200 operates in accordance with a control program (a computer program) stored in the ROM 203, the RAM 204, or the storage unit 205.

The I/O circuit 201 in the computer system 200 receives an input audio-visual signal from an external device such as a recording device, a communication network interface, or a television tuner. The I/O circuit 201 is connected with a data recorder 110 which can act on a recording medium 110A. The I/O circuit 201 can be connected with a communication-network transmission line or a broadcasting transmission line.

The storage unit 205 can store video data and audio data of one or more titles. The storage unit 205 includes a combination of a hard disc and a drive therefor. Alternatively, the storage unit 205 may include a large-scale memory or a combination of another recording medium and a drive therefor.

The ROM 203, the RAM 204, or the storage unit 205 stores table information (or map information) representing a predetermined relation between detected values of the items in the attributes of video contents and a level (degree) of the influence of the video contents on a biological body, that is, viewer's body.

Figure 14:
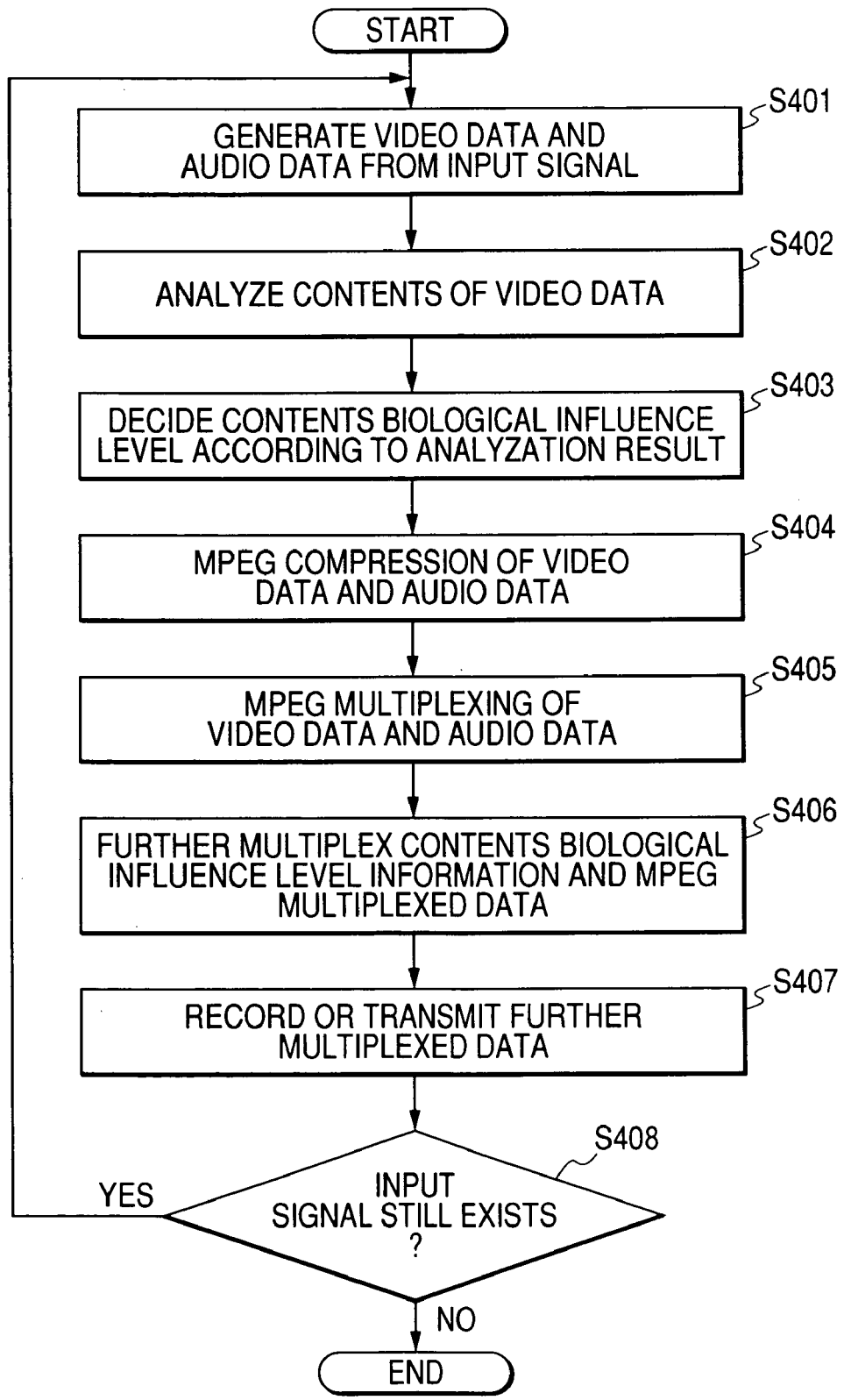
FIG. 14 is a flowchart of a control program for a computer system in FIG. 13.

FIG. 14 is a flowchart of the control program for the computer system 200. As shown in FIG. 14, a first step S401 of the control program generates video data and audio data from a current time segment of the input audio-visual signal which corresponds to a unit. Alternatively, the first step S401 may generate video data and audio data by accessing the storage unit 205.

A step S402 following the step S401 analyzes the contents of the video data in respect to each of the items in the attributes of the contents which are the ratio in area of a high contrast region to an entire picture, the flashing temporal frequency, the convergence angle for binocular stereopsis, and the spatial frequency of the recurrence of a simple figure in an entire picture. Specifically, the step S402 detects the values of the items in the attributes of the video contents.

A step S403 subsequent to the step S402 decides the contents biological influence level in response to at least one of the detected values of the items in the attributes of the video contents by referring to the predetermined relation represented by the table information. The step S403 generates information representing the decided contents biological influence level. In other words, the step S403 generates the contents biological influence level information.

A step S404 following the step S403 compresses the video data into MPEG video data by implementing the signal processing for MPEG video compression. In addition, the step S404 compresses the audio data into MPEG audio data by implementing the signal processing for MPEG audio compression.

A step S405 subsequent to the step S404 multiplexes the MPEG video data and the MPEG audio data into MPEG multiplexed audio-visual data according to the MPEG system standards.

A step S406 following the step S405 multiplexes the contents biological influence level information and the MPEG multiplexed audio-visual data to get further-multiplexed audio-visual data. Preferably, the further-multiplexed audio-visual data is the same in format as the output data from the composer 109 in FIG. 8. In more detail, the step S406 makes or processes the MPEG multiplexed audio-visual data and the contents biological influence level information into a unit of data (the further-multiplexed audio-visual data). The unit is, for example, a VOBU.

A step S407 subsequent to the step S406 outputs the further-multiplexed audio-visual data (the unit of data) to the recorder 110. In addition, the step S407 controls the recorder 110 to record the further-multiplexed audio-visual data on the recording medium 110A. Preferably, the recording of the further-multiplexed audio-visual data is on a block by block basis. For example, in the case where the recording medium 110A is a DVD, the recording of the further-multiplexed audio-visual data is implemented 2 KB by 2 KB.

Alternatively, the step S407 may convert the further-multiplexed audio-visual data into packets designed for communications or broadcasting. In this case, the step S407 sends the packets to the communication-network transmission line or the broadcasting transmission line.

A step S408 following the step S407 decides whether or not the input audio-visual signal is still present. When the input audio-visual signal is still present, the control program returns to the step S401. Otherwise, the control program exits from the step S408 and then the current execution cycle of the control program ends.

The step S408 may be modified to implement the following action. The step S408 decides whether or not remaining video data and audio data are present in the storage unit 205. When remaining video data and audio data are present, the control program returns to the step S401. Otherwise, the control program exits from the step S408 and then the current execution cycle of the control program ends.

Third Embodiment

Figure 15:
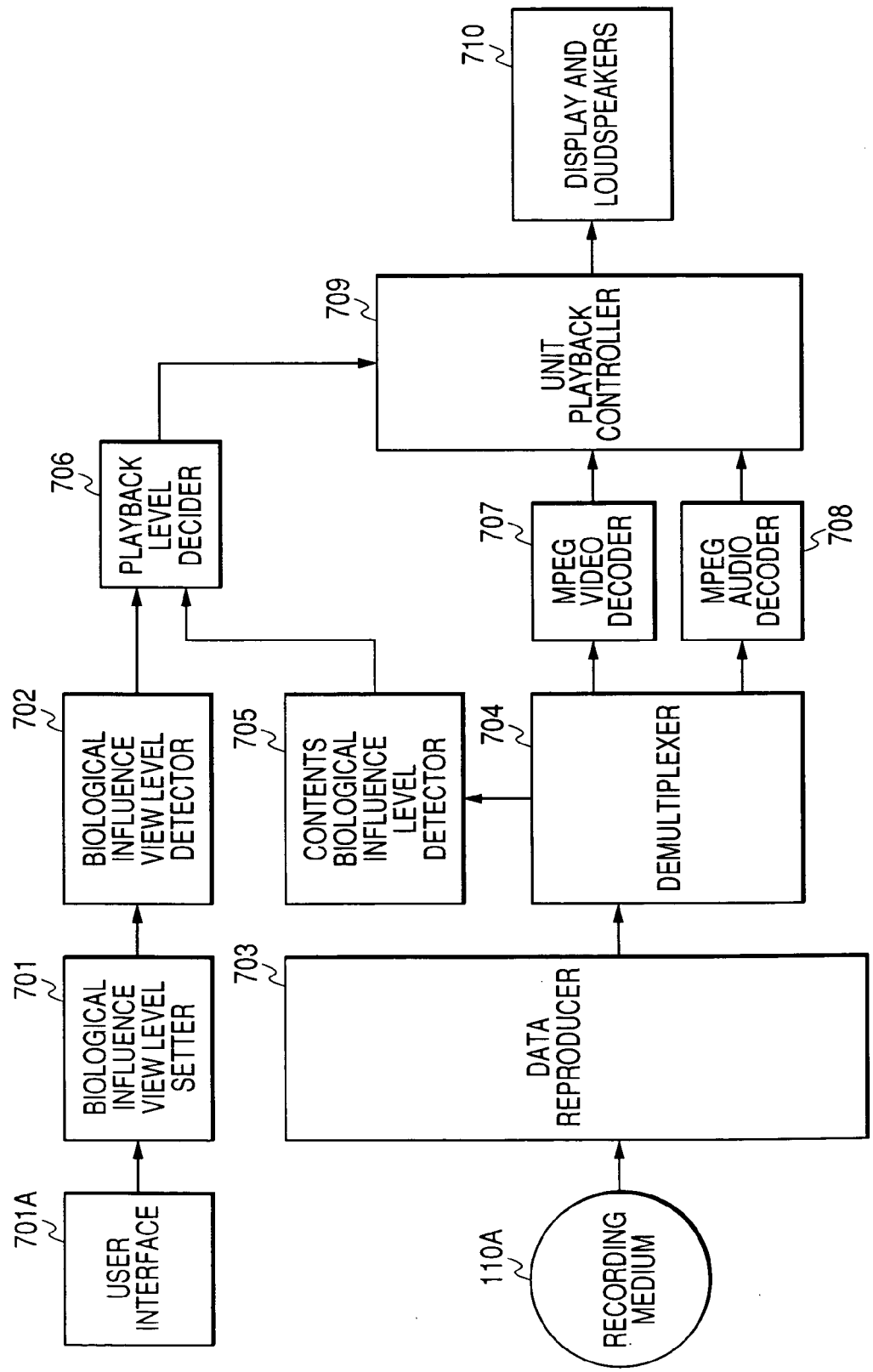
FIG. 15 is a block diagram of a video data reproducing apparatus according to a third embodiment of this invention.

FIG. 15 shows a video data reproducing apparatus according to a third embodiment of this invention. The apparatus of FIG. 15 can reproduce data recorded or transmitted by the apparatus of FIG. 8.

The apparatus of FIG. 15 includes a biological influence view level setter 701, a user interface 701A, a biological influence view level detector 702, a data reproducer 703, a demultiplexer 704, a contents biological influence level detector 705, a playback level decider 706, an MPEG video decoder 707, an MPEG audio decoder 708, a unit playback controller 709, and an output device 710. The data reproducer 703 can access a recording medium 110A.

The user interface 701A can be operated by a user. The user interface 701A, the biological influence view level setter 701, the biological influence view level detector 702, and the playback level decider 706 are successively connected in that order. The recording medium 110A uses, for example, a DVD. The data reproducer 703 and the demultiplexer 704 are successively connected in that order. The multiplexer 704 is connected with the contents biological influence level detector 705, the MPEG video decoder 707, and the MPEG audio decoder 708. The contents biological influence level detector 705 is followed by the playback level decider 706. The playback level decider 706 is connected with the unit playback controller 709. The MPEG video decoder 707 and the MPEG audio decoder 708 are followed by the unit playback controller 709. The unit playback controller 709 is connected with the output device 710. The output device 710 includes a display and loudspeakers.

In general, the apparatus of FIG. 15 operates in a preliminary mode before operating in a contents playback mode. During the preliminary mode of operation, the output device 710 visually or audibly requires the user to input specified information by operating the user interface 701A. The specified information relates to the attributes of the user. For example, the specified information represents the age of the user. The specified information may represent the current physical condition of the user or the condition of user's health. The user interface 701A feeds the input specified information to the setter 701.

It should be noted that the specified information may relate to other items such as the degree of user's immersion in displayed pictures, the visual sensation of the user, the autonomic nervous system of the user, the viewing environments, the viewing time, the binocular parallax, and the convergence.

The setter 701 decides a biological influence view level on the basis of the input specified information. The decided biological influence view level corresponds to the degree to which the biological body of a specified viewer (the user) is affected by indicated pictures. Furthermore, the decided biological influence view level is used as a reference indicating the upper limit of an allowable range of the influence of indicated pictures on the specified viewer. Specifically, the allowable range corresponds to conditions in which the biological body of the specified viewer is hardly affected by indicated pictures. For example, the decided biological influence view level can change among "1", "2", "3", "4", "5", "6", "7", and "8". The setter 701 generates information representative of the decided biological influence view level which is referred to as biological influence view level information.

It is preferable to provide a system which prevents the biological influence view level information from being easily altered. A first example of the system requires a password to be inputted, and then permits the change of the biological influence view level information only when a correct password is inputted. A second example of the system requires authentication, and then permits only a person, which is proved to be legitimate by the authentication, to alter the biological influence view level information. Such a system can prevents a child viewer from freely altering the biological influence view level information to get biological harmful pictures, and can permit only a parent to alter the biological influence view level information.

When the user interface 701 is operated by the user to start the reproduction of data from the recording medium 110A, the operation of the apparatus of FIG. 15 changes to the contents playback mode. The contents playback mode of operation is as follows. The reproducer 703 sequentially reads out units (for example, VOBUs) of data from the recording medium 110A. The reproducer 703 sequentially feeds the read-out units of data to the demultiplexer 704. Furthermore, the reproducer 703 processes logical data in the unit-based structure to extract the pack header from every pack formed by the logical data. The reproducer 703 recovers, from the extracted pack headers, information (pack ID information) which can be used for sorting or separating the received packs. The reproducer 703 feeds the pack separating information to the demultiplexer 704.

It should be noted that a receiving device connected with the demultiplexer 704 may be provided. The receiving device receives a stream of packets of data from a communication-network transmission line or a broadcasting transmission line. The receiving device converts (depackets) the stream of packets into units of data. The receiving device feeds the units of data to the demultiplexer 704. Furthermore, the receiving device processes logical data in the unit-based structure to extract the pack header from every pack formed by the logical data. The receiving device recovers, from the extracted pack headers, information (pack ID information) which can be used for sorting or separating the received packs. The receiving device feeds the pack separating information to the demultiplexer 704.

The demultiplexer 704 separates each of the units of data into an NV_PACK, V_PACKs, A_PACKs, and a D_PACK in response to the pack separating information. In other words, the demultiplexer 704 separates each of the units of data into stream search information, MPEG video data, MPEG audio data, and a D_PACK loaded with contents biological influence level information. The demultiplexer 704 feeds the D_PACK, the MPEG video data (the V_PACKs), and the MPEG audio data (the A_PACKs) to the detector 705, the decoder 707, and the decoder 708, respectively. The device 707 decodes the MPEG video data according to an MPEG video decoding procedure to get decoded video data. The decoder 707 feeds the decoded video data to the controller 709. The device 708 decodes the MPEG audio data according to an MPEG audio decoding procedure to get decoded audio data. The decoder 708 feeds the decoded audio data to the controller 709. The device 705 detects the contents biological influence level information in the D_PACK. Furthermore, the detector 705 extracts the contents biological influence level information from the D_PACK. The detector 705 feeds the extracted contents biological influence level information to the decider 706.

The detector 702 accesses the setter 701 to receive the biological influence view level information therefrom. The detector 702 feeds the biological influence view level information to the decider 706. The device 706 decides whether the playback (reproduction) of video data should be permitted or inhibited on the basis of the contents biological influence level information and the biological influence view level information. The decision by the device 706 is executed for every unit of data.

The decider 706 includes a memory loaded with a reference table or matrix shown in FIG. 16. The reference table has an array of cells (elements). Each of the cells is assigned to one of the 8 different levels represented by the contents biological influence level information and one of the 8 different levels represented by the biological influence view level information, that is, one of the 8 different contents biological influence levels and one of the 8 different biological influence view levels. Each cell has one bit representing either the permission of data playback or the inhibition thereof. In FIG. 16, a bit in a cell which is in a logic state corresponding to the permission of data playback is denoted by the mark "O" while a bit in a cell which is in a logic state corresponding to the inhibition of data playback is denoted by the mark "X".

The device 706 decides whether the playback of video data (contents data) should be permitted or inhibited by referring to the reference table of FIG. 16 in response to the level represented by the contents biological influence level information and the level represented by the biological influence view level information. The decider 706 notifies the result of the decision to the controller 709.

Alternatively, the decider 706 may compare the contents biological influence level and the biological influence view level (the level represented by the contents biological influence level information and the level represented by the biological influence view level information) without using the reference table of FIG. 16. In this case, when the contents biological influence level is greater than the biological influence view level, the device 706 decides that the playback of video data (contents data) should be inhibited. On the other hand, when the contents biological influence level is equal to or smaller than the biological influence view level, the device 706 decides that the playback of video data (contents data) should be permitted.

The reference table of FIG. 16 may be modified so that each of the cells has a parameter value which can change among three or more different values. In this case, the parameter values in the respective cells are designed to vary or decrease the visual effects of indicated pictures as a function of the contents biological influence level and the biological influence view level.

The controller 709 passes a current unit of video and audio data (contents data) from the decoders 707 and 708 to the device 710 when the corresponding decision result notified by the decider 706 represents that the playback should be permitted. The display in the device 710 visualizes the current unit of video data in a 2D or 3D fashion. At the same time, the loudspeakers in the device 710 convert the current unit of audio data into sounds. Accordingly, the playback of the current unit of video and audio data (contents data) is implemented. On the other hand, the controller 709 blocks the transmission of a current unit of video and audio data from the decoders 707 and 708 to the device 710 when the corresponding decision result represents that the playback should be inhibited. Thus, in this case, the current unit of video data is prevented from being visualized by the display in the device 710. At the same time, the current unit of audio data is prevented from being converted into sounds by the loudspeakers in the device 710. Accordingly, the playback of the current unit of video and audio data is not implemented. In other words, the current unit of video and audio data (contents data) is skipped.

Figure 17:
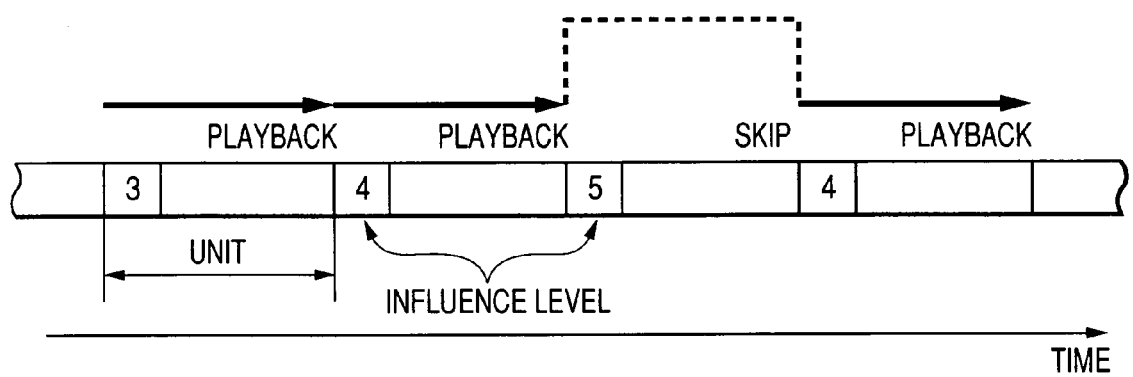
FIG. 17 is a time-domain diagram showing a first example of a sequence of units of data to be recorded in the third embodiment of this invention.

For example, in the case where the biological influence view level is "4", every unit of video and audio data (contents data) which corresponds to a contents biological influence level of "4" or smaller is played back as shown in FIG. 17. On the other hand, every unit of video and audio data which corresponds to a contents biological influence level of "5" or greater is inhibited from being played back. In other words, such a unit of video and audio data is skipped as shown in FIG. 17. For example, the skipped unit of video and audio data represents a scene. In this case, the scene represented by the skipped unit is cut from a stream of scenes.

Every unit of video data corresponds to a playback time interval of, for example, 0.4 second to 1.0 second. Thus, one scene represented by video data generally corresponds to one or more units of video data. The contents biological influence level can be set for every unit of video data. Accordingly, the contents biological influence level can be set for every scene represented by video data. As the contents biological influence level increases, the corresponding pictures are more powerful and are more harmful to the biological body of a viewer. The biological influence view level defines the upper limit of an allowable range of the contents biological influence level in which every corresponding unit of video data is permitted to be played back. It is preferable to previously set the biological influence view level in view of the age of a viewer or the current physical condition of the viewer.

Figure 18:
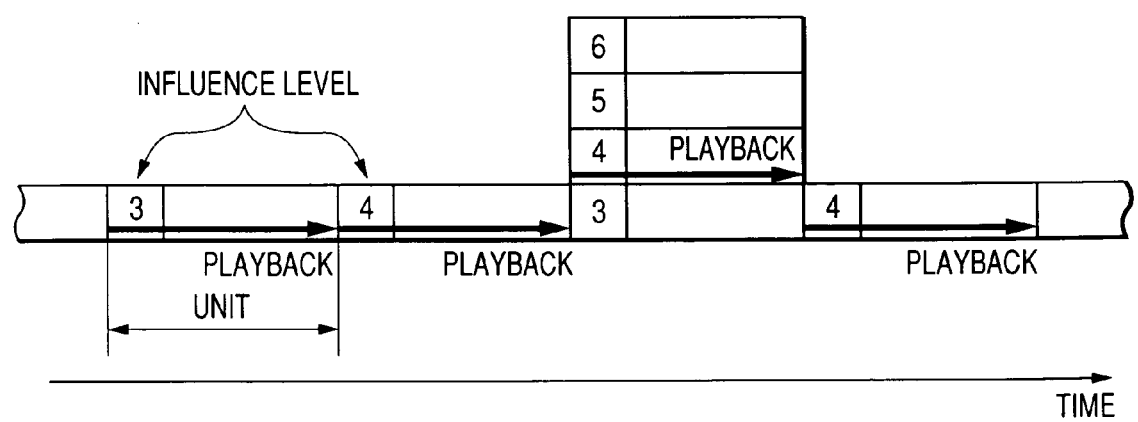
FIG. 18 is a time-domain diagram showing a second example of a sequence of units of data to be recorded in the third embodiment of this invention.

With reference to FIG. 18, a same playback timing is assigned to 1) a unit having contents data and information representing a contents biological influence level of "3" for the contents data, 2) a unit having contents data and information representing a contents biological influence level of "4" for the contents data, 3) a unit having contents data and information representing a contents biological influence level of "5" for the contents data, and 4) a unit having contents data and information representing a contents biological influence level of "6" for the contents data. For example, in the case where the biological influence view level is "4", every unit of video and audio data which corresponds to a contents biological influence level of "4" or smaller is played back. On the other hand, every unit of video and audio data which corresponds to a contents biological influence level of "5" or greater is inhibited from being played back. In other words, such a unit of video and audio data is skipped during playback. In a time range corresponding to a playback timing to which the above-indicated four units of contents data are assigned, the controller 709 selects one from the four units according to prescribed rules and passes the selected unit to the device 710. Thus, the selected unit of contents data is played back by the device 710. The selection rules used by the controller 709 are such that ones are preliminarily selected from same-timing units which have contents biological influence levels equal to or smaller than the biological influence view level, and then one is finally selected from the preliminarily selected units which is the greatest in contents biological influence level. Thus, in the case where the biological influence view level is "4", the unit of contents data which has a contents biological influence level of "4" is finally selected from the above-indicated four units. Accordingly, among the same-timing units, one is selected which properly corresponds to the biological influence view level. For example, the above-indicated four units represent different scenes respectively. In this case, one is selected from the different scenes as an actually reproduced scene. In the event that all the same-timing units have contents biological influence levels greater than the biological influence view level, the playback is temporarily suspended at that timing.

When it is decided on the basis of the biological influence view level and the contents biological influence level that the playback of a current unit of video data should be inhibited or when all same-timing units have contents biological influence levels greater than the biological influence view level, the controller 709 may process the current unit of video data to make the contents biological influence level equal to or smaller than the biological influence view level. Thus, the processing of the current unit is to reduce the visual effects of pictures represented by the current unit. The processing of the current unit is to, for example, scumble or mosaic pictures represented by the current unit. In more detail, the processing of the current unit is designed to control at least one of the spatial frequency, the temporal frequency, the resolution, the contrast, the flicker, and the distortion of pictures represented by the current unit in the direction of reducing the visual effects of the pictures. The decrease in the visual effects causes the pictures to less affect the biological body of a viewer. In this case, the controller 709 feeds the processed unit of contents data to the device 710 so that the processed unit will be played back by the device 710.

In the case where the cells in the reference table have respective parameter values each changeable among three or more different values, the decider 706 searches the reference table for a target parameter value in response to the contents biological influence level and the biological influence view level. The decider 706 notifies the target parameter value to the controller 709. The controller 709 processes a current unit of contents data in response to the target parameter value to decrease the visual effects of pictures represented by the current unit. The processing of the current unit of contents data is designed to control at least one of the spatial frequency, the temporal frequency, the resolution, the contrast, the flicker, and the distortion of pictures represented by the contents data in the direction of reducing the visual effects of the pictures. The decrease in the visual effects causes the pictures to less affect the biological body of a viewer. The controller 709 feeds the processed unit of contents data to the device 710 so that the processed unit will be played back by the device 710.

As previously described, the biological influence view level is set in advance for a viewer. Reproduced pictures can be selected or altered in response to the biological influence view level. A certain scene in a stream of reproduced pictures which is harmful to the viewer can be skipped in response to the biological influence view level. Therefore, contents data can be played back in a fashion safe and proper to the viewer.

Fourth Embodiment

Figure 19:
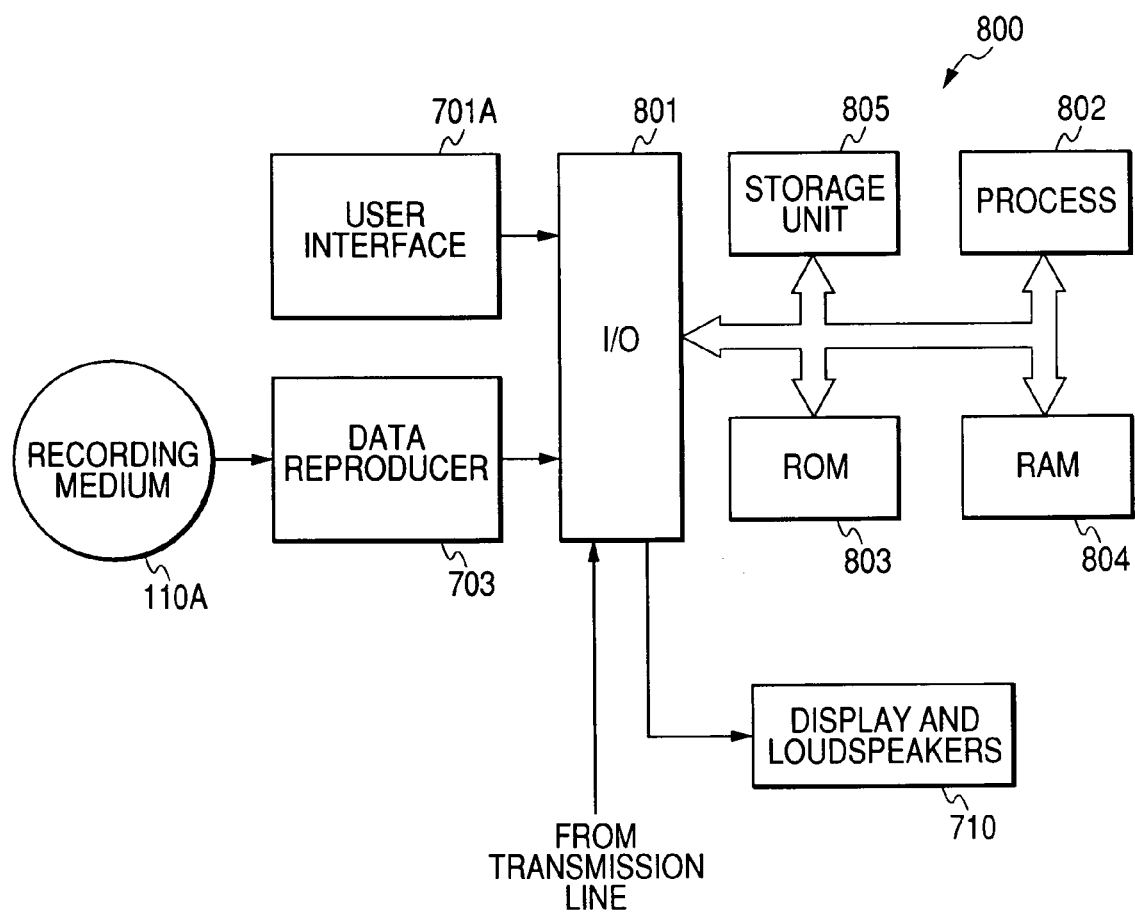
FIG. 19 is a block diagram of a video data reproducing apparatus according to a fourth embodiment of this invention.

FIG. 19 shows a video data reproducing apparatus according to a fourth embodiment of this invention. The video data reproducing apparatus in FIG. 19 is similar to that in FIG. 15 except for design changes mentioned hereafter.

The video data reproducing apparatus in FIG. 19 includes a computer system 800 having a combination of an I/O circuit 801, a processing section 802, a ROM 803, a RAM 804, and a storage unit 805. The computer system 800 operates in accordance with a control program (a computer program) stored in the ROM 803, the RAM 804, or the storage unit 805. The storage unit 805 includes a combination of a hard disc and a drive therefor. Alternatively, the storage unit 805 may include a large-scale memory or a combination of another recording medium and a drive therefor.

The ROM 803, the RAM 804, or the storage unit 805 stores a signal representing the reference table of FIG. 16.

The I/O circuit 801 in the computer system 800 is connected with a user interface 701A, a data reproducer 703, and an output device 710. The I/O circuit 201 can be connected with a communication-network transmission line or a broadcasting transmission line.

The control program for the computer system 800 has a first segment related to a preliminary mode of operation. According to the first segment of the control program, the computer system 800 operates as follows. The computer system 800 controls the output device 710 to visually or audibly requires a user to input specified information by operating the user interface 701A. The specified information relates to the attributes of the user or the current physical condition of the user. The computer system 800 receives the input specified information from the user interface 701A. The computer system 800 decides a biological influence view level on the basis of the input specified information. The computer system 800 stores information representative of the decided biological influence view level into the RAM 804 for later use. The information representative of the decided biological influence view level is referred to as biological influence view level information.

Figure 20:
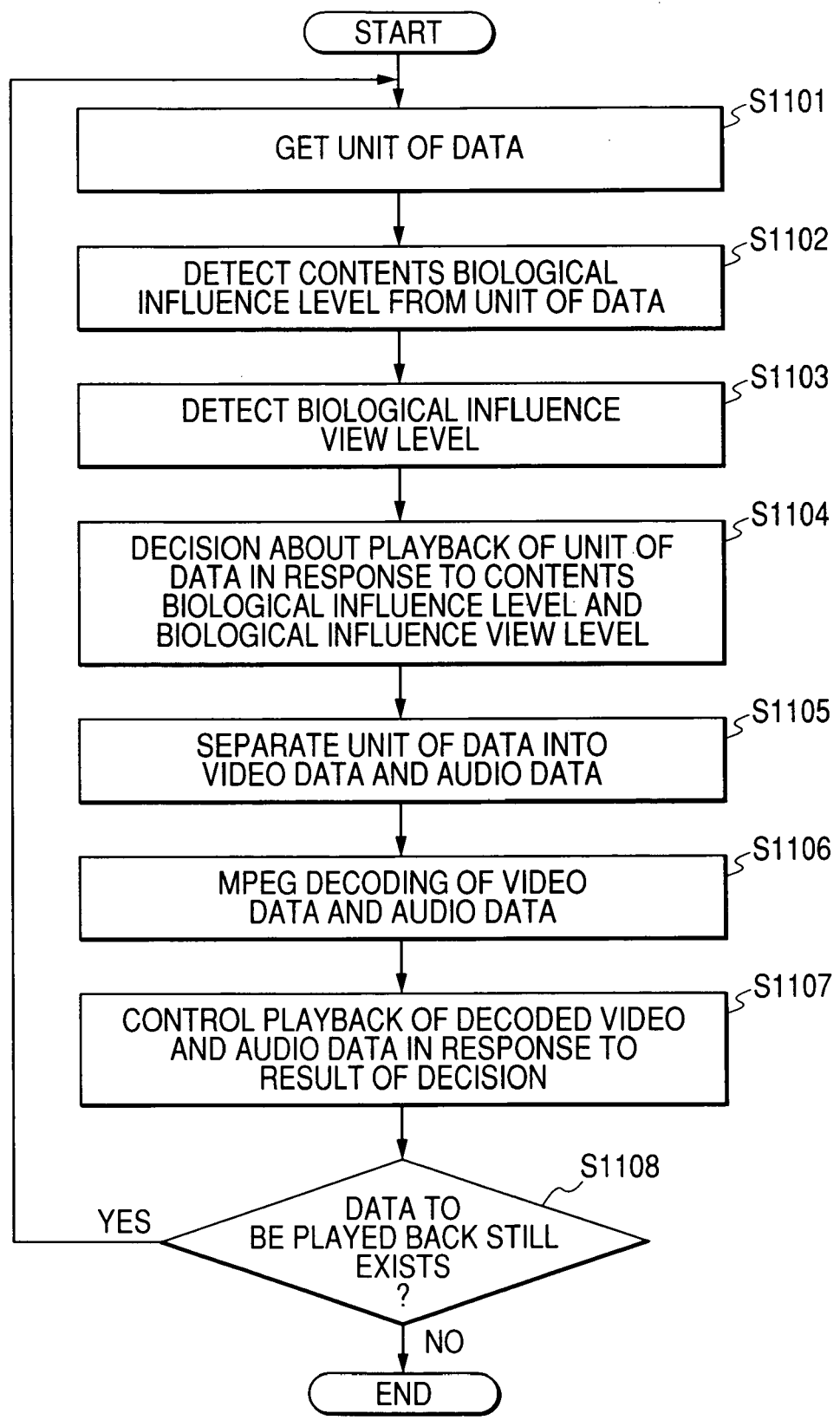
FIG. 20 is a flowchart of a control program for a computer system in FIG. 19.

The control program for the computer system 800 has a second segment related to a contents playback mode of operation. FIG. 20 is a flowchart of the second segment of the control program for the computer system 800. As shown in FIG. 20, a first step S1101 of the program segment controls the reproducer 703 to read out a unit (for example, VOBU) of data from a recording medium 110A, and to extract pack separating information from the read-out unit of data. The step S1101 receives the read-out unit of data and the pack separating information from the reproducer 703. Alternatively, the step S1101 may receive a stream of packets of data from the communication-network transmission line or the broadcasting transmission line. In this case, the step S1101 converts the received packet data into a unit of data. Furthermore, the step S1101 extracts pack separating information from the unit of data.

A step S1102 following the step S1101 detects information representative of a contents biological influence level which is included in the unit of data. For example, the step S1102 separates a D_PACK from the unit of data in response to the pack separating information, and then extracts the contents biological influence level information from the D_PACK.

A step S1103 subsequent to the step S1102 retrieves the information representative of the biological influence view level from the RAM 804.

A step S1104 following the step S1103 decides whether the playback of the unit of data should be permitted or inhibited by referring to the reference table of FIG. 16 in response to the contents biological influence level and the biological influence view level.

Alternatively, the step S1104 may compare the contents biological influence level and the biological influence view level without using the reference table of FIG. 16. In this case, when the contents biological influence level is greater than the biological influence view level, the step S1104 decides that the playback of the unit of data should be inhibited. On the other hand, when the contents biological influence level is equal to or smaller than the biological influence view level, the step S1104 decides that the playback of the unit of data should be permitted.

A step S1105 subsequent to the step S1104 separates the unit of data into V_PACKs and A_PACKs in response to the pack separating information. In other words, the step S1105 separates the unit of data into MPEG video data and MPEG audio data.

A step S1106 following the step S1105 decodes the MPEG video data according to an MPEG video decoding procedure to get decoded video data. In addition, the step S1106 decodes the MPEG audio data according to an MPEG audio decoding procedure to get decoded audio data.

A step S1107 subsequent to the step S1106 controls the playback of the decoded video data and the decoded audio data by the output device 710 in response to the result of the decision by the step S1104. Specifically, the step S1107 feeds the decoded video data and the decoded audio data to the output device 710 when the decision result represents that the playback should be permitted. In this case, the display in the output device 710 visualizes the decoded video data in a 2D or 3D fashion. At the same time, the loudspeakers in the output device 710 convert the decoded audio data into sounds. Accordingly, the playback of the unit of data (contents data) is implemented. On the other hand, the step S1107 does not feed the decoded video data and the decoded audio data to the output device 710 when the decision result represents that the playback should be inhibited. Thus, in this case, the decoded video data is prevented from being visualized by the display in the output device 710. At the same time, the decoded audio data is prevented from being converted into sounds by the loudspeakers in the output device 710. Accordingly, the playback of the unit of data (contents data) is not implemented. In other words, the unit of data is skipped.

When there are plural units of data which are assigned to a same playback timing, the step S1107 selects one from the plural units of data according to the biological influence view level and the contents biological influence levels represented by the respective plural units. For example, the step S1107 preliminarily selects ones from the plural units which have the contents biological influence levels equal to or smaller than the biological influence view level, and then finally selects one from the preliminarily selected units which is the greatest in contents biological influence level. The step S1107 feeds the decoded video data and the decoded audio data, which correspond to the selected unit, to the output device 710. Thus, the playback of the selected unit of data (contents data) is implemented.

In the case where the decision result represents that the playback should be inhibited, the step S1107 may process the decoded video data to decrease the visual effects of pictures represented by the decoded video data in response to the biological influence view level and the contents biological influence level. In this case, the step S1107 feeds the processed video data and the decoded audio data to the output device 710 so that the processed video data and the decoded audio data will be played back by the output device 710.

A step S1108 following the step S1107 accesses the reproducer 703 to decide whether or not data to be read out from the recording medium 110A remains. When data remains, the program returns from the step S1108 to the step S1101. Otherwise, the program exits from the step S1108, and then the current execution cycle of the program segment ends.

Alternatively, the step S1108 may decide whether or not data is still coming from the communication-network transmission line or the broadcasting transmission line. In this case, when data is still coming, the program returns from the step S1108 to the step S1101. Otherwise, the program exits from the step S1108, and then the current execution cycle of the program segment ends.

Fifth Embodiment

Figure 21:
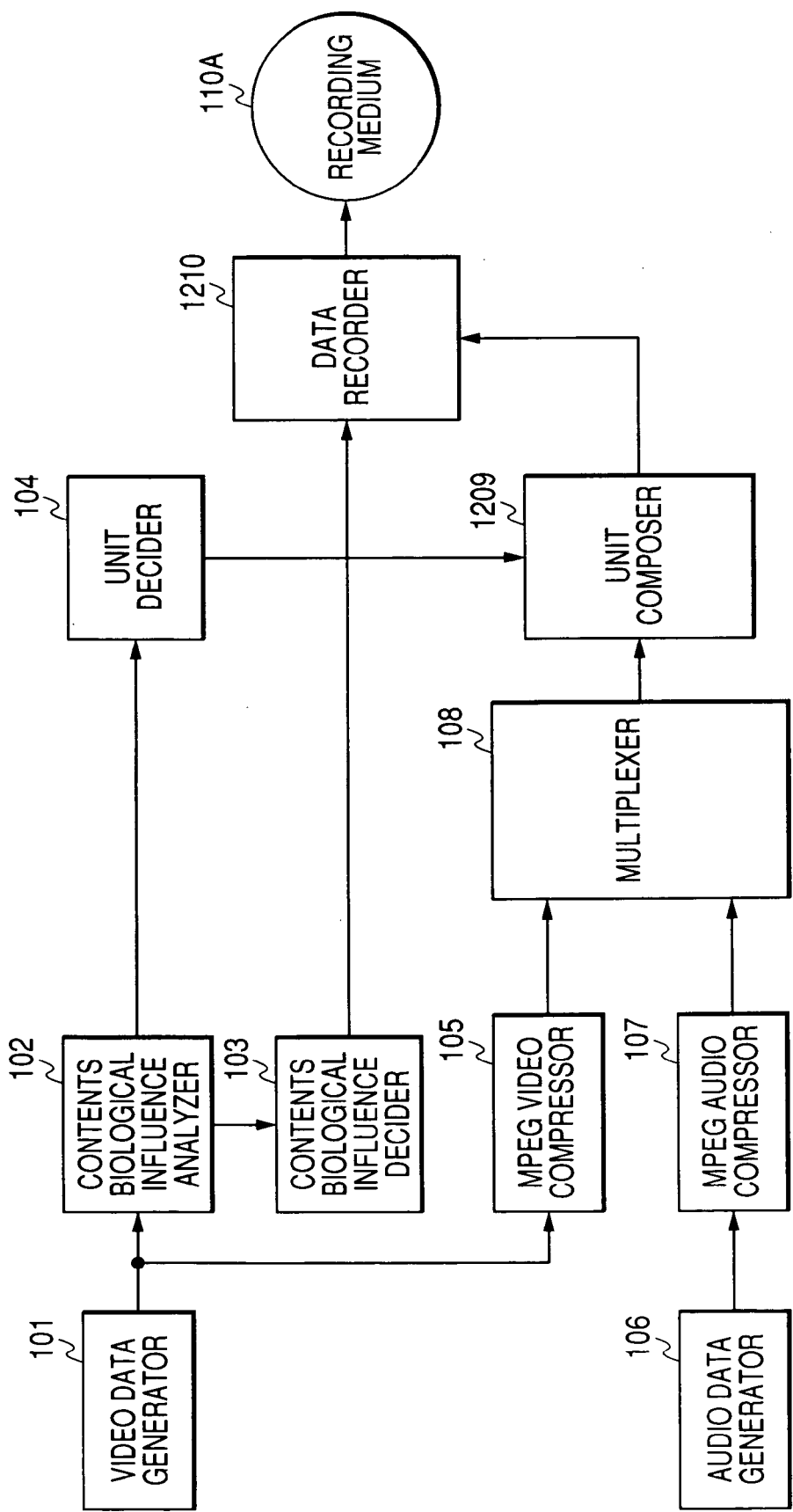
FIG. 21 is a block diagram of a video data recording apparatus according to a fifth embodiment of this invention.

FIG. 21 shows a video data recording apparatus according to a fifth embodiment of this invention. The video data recording apparatus includes a video data processing apparatus. The apparatus of FIG. 21 is similar to the apparatus of FIG. 8 except for design changes mentioned hereafter.

The apparatus of FIG. 21 includes a unit composer 1209 and a data recorder 1210 instead of the unit composer 109 and the data recorder 110 (FIG. 8). As shown in FIG. 21, the contents biological influence decider 103 is connected with the data recorder 1210 rather than the unit composer 1209. The decider 103 feeds the contents biological influence level information to the recorder 1210.

The composer 1209 receives the instruction signal (the interval boundary signal) from the decider 104. The composer 1209 receives the MPEG multiplexed audio-visual data from the multiplexer 108. The composer 1209 makes or processes the video data and the audio data in the MPEG multiplexed audio-visual data into a sequence of units (for example, VOBUs) in response to the instruction signal. The composer 1209 outputs the sequence of units of data to the recorder 1210.

The device 1210 records the contents biological influence level information and the units of data on the recording medium 110A. In general, the contents biological influence level information varies from scene to scene represented by the video data. Preferably, the decider 103 generates ID (identification) information about each scene which indicates the correspondence relation between the scene and the contents biological influence level information. In this case, the decider 103 inserts the scene ID information into the contents biological influence level information. Thus, the scene ID information is recorded on the recording medium 110A during the recording of the contents biological influence level information thereon.

It should be noted that the recorder 1210 may generate ID information about each scene which indicates the correspondence relation between the scene and the contents biological influence level information. In this case, the device 1210 records the generated ID information on the recording medium 110A during the recording of the contents biological influence level information and the units of data thereon.

Preferably, the device 1210 records the contents biological influence level information and the MPEG stream data (the units of data) on separate areas in the recording medium 110A respectively. Furthermore, the contents biological influence level information and the MPEG stream data recorded on the recording medium 110A are of a prescribed format conforming with the DVD-Video standards.

It should be noted that the device 1210 may record the contents biological influence level information and depth information pieces ZP on a common area in the recording medium 110A. In this case, the recorder 1210 may get or generate the depth information pieces ZP from the MPEG stream data.

Figure 22:
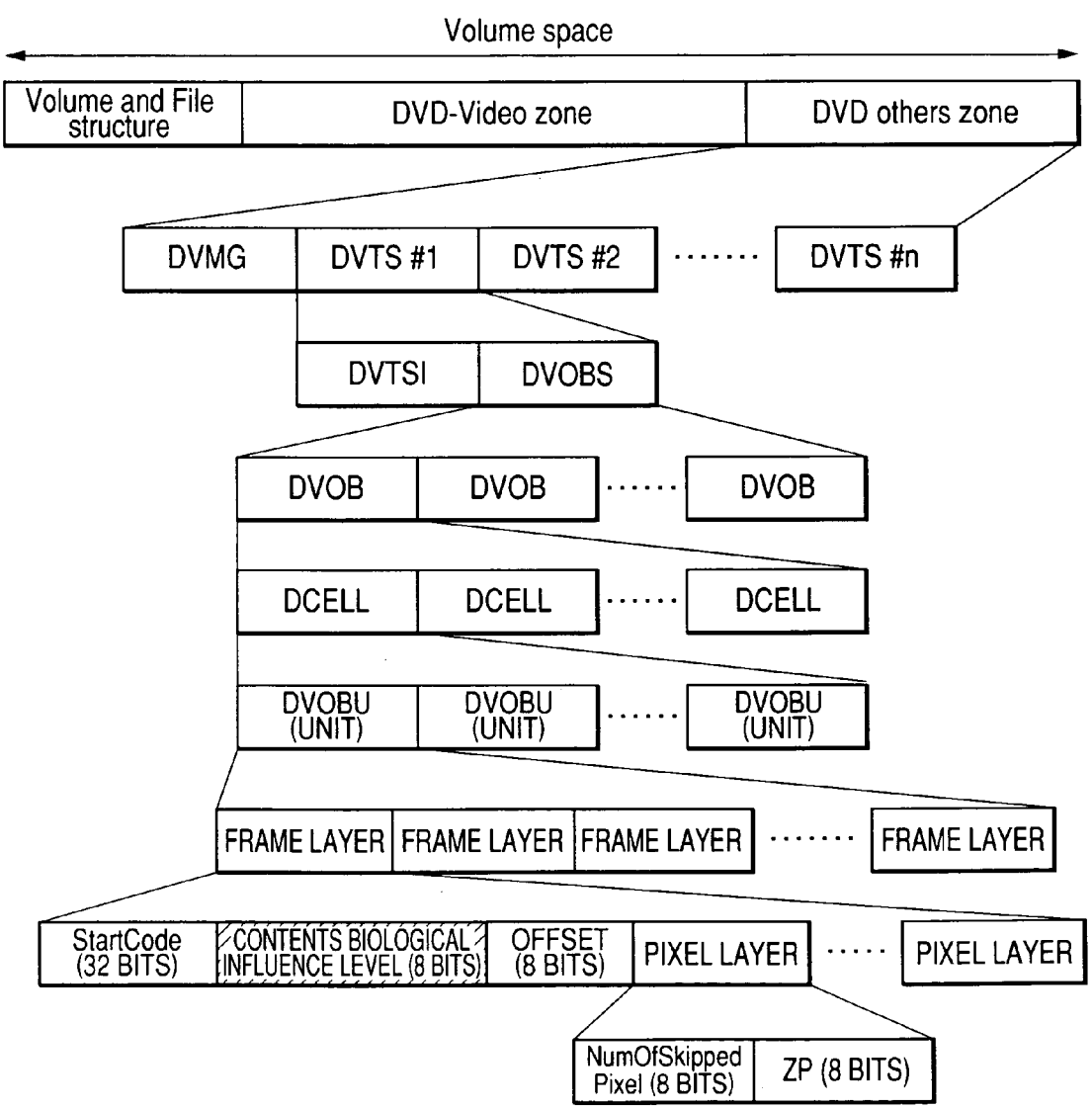
FIG. 22 is a diagram showing an example of the format of recorded data in the fifth embodiment of this invention.

FIG. 22 shows an example of the prescribed recorded data format used by the apparatus of FIG. 21. According to the recorded data format in FIG. 22, the contents biological influence level information is stored in a DVD others zone prescribed by the DVD-Video standards.

With reference to FIG. 22, the volume space (the recording layer) in a recording medium, that is, a DVD-Video, is divided into a volume and file structure, a DVD-Video zone, and a DVD others zone. The volume and file structure is a zone storing a file system. The DVD-Video zone stores main data including MPEG stream data. The DVD others zone stores additional information inclusive of the contents biological influence level information.

Preferably, the DVD others zone is similar in structure to the DVD-Video zone. Specifically, DVMG and DVTSs (DVTS#1, DVTS#2, ..., and DVTS#n) are placed in the DVD others zone. The DVGM and DVTSs correspond to VMG and VTSs in the DVD-Video zone.

DVTSI and DVOBS are described in each of the DVTSs. The DVTSI and DVOBS correspond to VTSI and VOBS in a VTS. The DVTSI has address information and identification (ID) information concerning video data and audio data to be played back. The DVOBS does not have an MPEG multiplexed audio-visual stream. The DVOBS is loaded with information merely relating to an MPEG multiplexed audio-visual stream composed of contents data stored in the DVD-Video zone. The DVOBS consists of DVOBs which correspond to VOBs in VOBS. Each of the DVOBs is divided into segments called "CELL". One CELL consists of DVOBUs which correspond to VOBUs.

Each of the DVOBUs consists of a plurality of frame layers which are equal in structure to those in FIG. 9. Each of the frame layers has a succession of a 32-bit start code signal, the contents biological influence level information, an 8-bit offset signal, and 16-bit pixel layers. Each of the 16-bit pixel layers include an 8-bit depth information piece ZP. Thus, the contents biological influence level information is stored in the frame layers in each DVOBU.

It is preferable that the contents biological influence level information and the depth information pieces ZP are placed in a D_PACK within each DVOBU. It should be noted that D_PACKs may be omitted from VOBUs in the DVD-Video zone.

As mentioned above, the contents biological influence level information is described in each DVOBU extending in an area which is assigned to the DVOBS information merely relating to an MPEG multiplexed audio-visual stream composed of contents data stored in the DVD-Video zone, and which is separate from an area assigned to the MPEG contents data.

The contents biological influence level information varies from unit to unit given by the decider 104. Preferably, the contents biological influence level information varies from scene to scene represented by the video data. For example, the frame layers in the DVD others zone are linked with those in the DVD-Video zone. Information representing this link is stored in a suitable location. Thereby, the correspondence relation between the contents biological influence level information and a unit of data is set in a fashion conforming with the DVD-Video standards.

Figure 23:
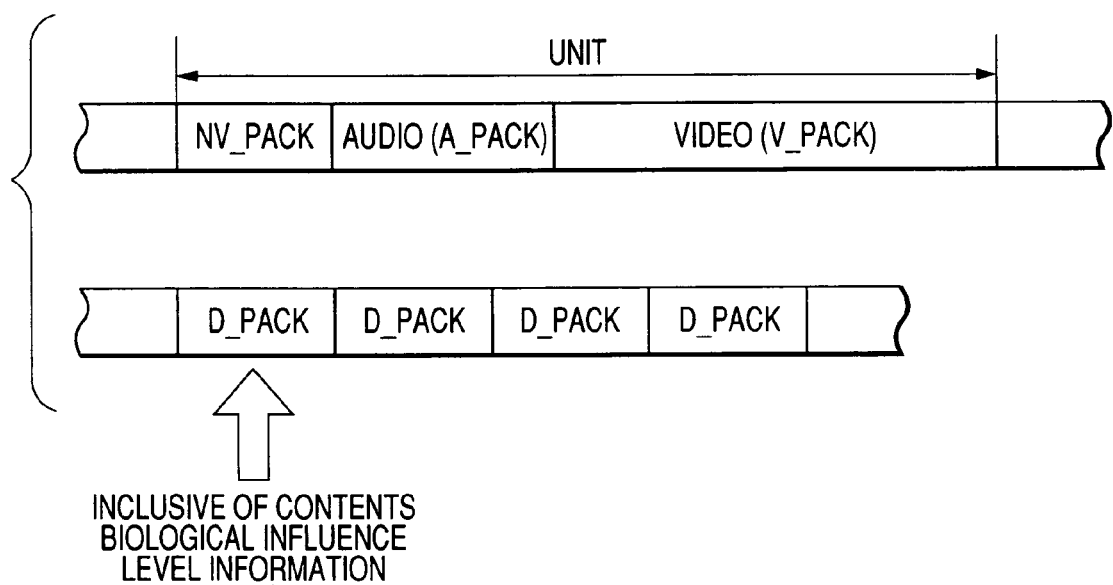
FIG. 23 is a diagram of an example of the structure of one unit and a sequence of D_PACKs in the fifth embodiment of this invention.

FIG. 23 shows another example of the recorded data format. With reference to FIG. 23, one unit consists of an NV_PACK, an audio zone, and a video zone which are successively arranged in that order. The audio zone is occupied by one or more A_PACKs. The video zone is occupied by one or more V_PACKs. There is a succession of D_PACKs in an area separate from the places of units of data (MPEG stream data). Each of the D_PACKs stores the contents biological influence level information and the depth information pieces ZP. The D_PACKs are linked with the V_PACKs. Information representing this link is stored in a suitable location as information indicative of the correspondence relation between the contents biological influence level information and a unit of contents data.

Preferably, the MPEG stream data and the contents biological influence level information are recorded on the same recording medium 110A. The MPEG stream data and the contents biological influence level information may be recorded on different recording mediums, respectively. According to another modification, one of the MPEG stream data and the contents biological influence level information is recorded on the recording medium 110A while the other is sent via a transmission line. According to still another modification, the MPEG stream data and the contents biological influence level information are sent to a same destination or different destinations via a transmission line or lines.

As previously described, the MPEG stream data and the contents biological influence level information are recorded on separate areas in the recording medium 110A respectively. In general, the contents biological influence level information varies from unit to unit related to the MPEG stream data. Since there is the correspondence relation between the MPEG stream data and the contents biological influence level information, it is possible to detect the contents biological influence level information for every unit.

As understood from the above description, the contents biological influence level information indicates the possibility of the influence of related pictures on the biological body of a viewer. The biological influence level information and the audio-visual data can be recorded on separate areas in the recording medium 110A respectively on a scene-by-scene basis.

Sixth Embodiment

A sixth embodiment of this invention is similar to the second embodiment thereof (FIGS. 13 and 14) except for design changes mentioned hereafter. Basically, the sixth embodiment of this invention is similar in operation to the fifth embodiment thereof (FIGS. 21, 22, and 23).

Figure 24:
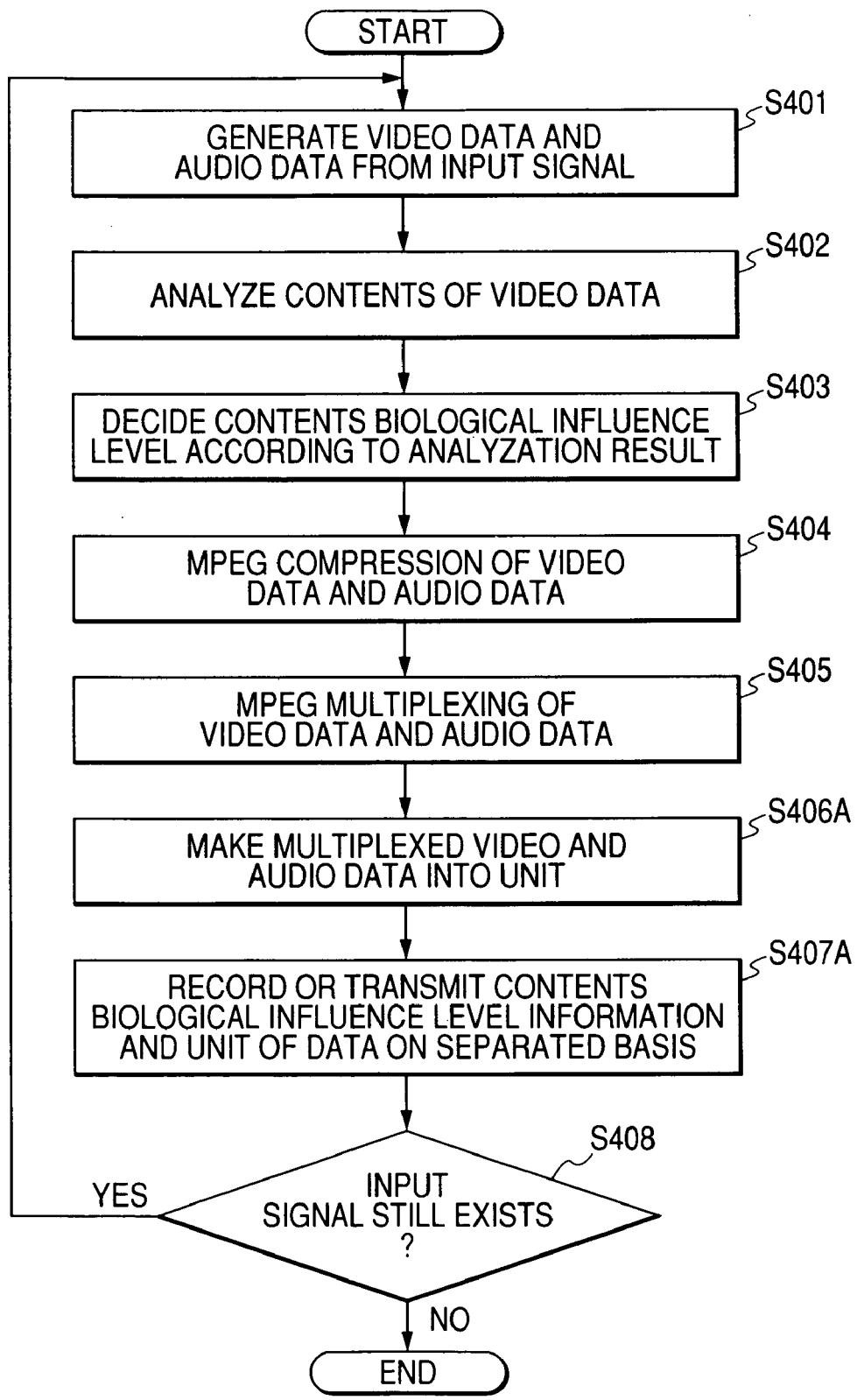
FIG. 24 is a flowchart of a control program for a computer system in a sixth embodiment of this invention.

FIG. 24 is a flowchart of a control program for the computer system 200 (FIG. 13) in the sixth embodiment of this invention. The control program in FIG. 24 is a modification of that in FIG. 14. Specifically, the control program in FIG. 24 includes steps S406A and S407A instead of the steps S406 and S407 (FIG. 14).

The step S406A makes or processes the MPEG multiplexed audio-visual data into a unit of data which is the same in format as the output data from the composer 1209 in FIG. 21.

The step S407A outputs the contents biological influence level information and the unit of data to the recorder 1210. In addition, the step S407A controls the recorder 1210 to record the contents biological influence level information and the unit of data (MPEG multiplexed audio-visual data) on different areas in the recording medium 110A respectively. Furthermore, the step S407A generates information representing the link (the correspondence relation) between the contents biological influence level information and the unit of data. The step S407A controls the recorder 1210 to record the link information on a suitable location in the recording medium 110A. Preferably, the step S407A gets or generates depth information pieces ZP from the unit of data. Then, the step S407A combines the contents biological influence level information and the depth information pieces ZP into a D_PACK before outputting the unit of data and the D_PACK to the recorder 1210. The step S407A controls the recorder 1210 to record the unit of data and the D_PACK on different areas in the recording medium 110A respectively.

Alternatively, the step S407A may convert the contents biological influence level information, the unit of data, and the link information into packets designed for communications or broadcasting. In this case, the step S407A sends the packets to the communication-network transmission line or the broadcasting transmission line.

Seventh Embodiment

Figure 25:
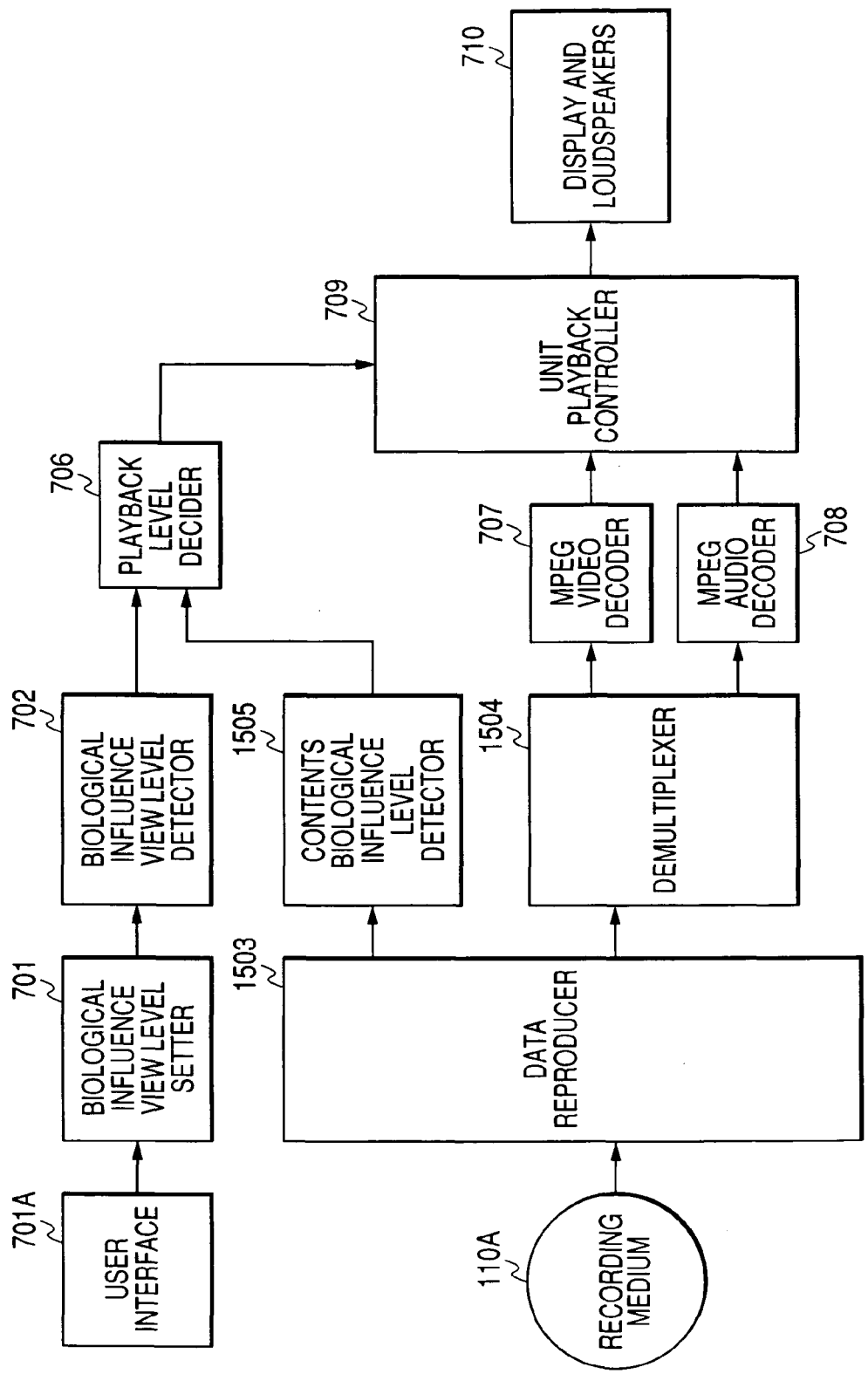
FIG. 25 is a block diagram of a video data reproducing apparatus according to a seventh embodiment of this invention.

FIG. 25 shows a video data reproducing apparatus according to a seventh embodiment of this invention. The apparatus of FIG. 25 can reproduce data recorded or transmitted by the apparatus of FIG. 21. The apparatus of FIG. 25 is similar to that of FIG. 15 except for design changes mentioned hereafter.

The apparatus of FIG. 25 includes a data reproducer 1503, a demultiplexer 1504, and a contents biological influence level detector 1505 instead of the data reproducer 703, the demultiplexer 704, and the contents biological influence level detector 705 (FIG. 15).

With reference to FIG. 25, the data reproducer 1503 can access the recording medium 110A. The data reproducer 1503 is connected with the demultiplexer 1504 and the contents biological influence level detector 1505. The demultiplexer 1504 is followed by the MPEG video decoder 707 and the MPEG audio decoder 708. The contents biological influence level detector 1505 is followed by the playback level decider 706.

The contents playback mode of operation of the apparatus in FIG. 25 is as follows. The reproducer 1503 reads out contents biological influence level information from the recording medium 110A, and sequentially reads out units (for example, VOBUs) of MPEG multiplexed audio-visual data therefrom. The reproducer 1503 feeds the read-out contents biological influence level information to the detector 1505. The reproducer 1503 sequentially feeds the read-out units of MPEG multiplexed audio-visual data to the demultiplexer 1504. Furthermore, the reproducer 1503 extracts pack separating information from the read-out units of MPEG multiplexed audio-visual data. The reproducer 1503 feeds the extracted pack separating information to the demultiplexer 1504.

The reproducer 1503 may sequentially read out D_PACKs inclusive of the contents biological influence level information from the recording medium 110A. In this case, the reproducer 1503 sequentially outputs the read-out D_PACKs to the detector 1505.

It should be noted that a receiving device connected with the demultiplexer 1504 and the detector 1505 may be provided. The receiving device receives a stream of packets of data from a communication-network transmission line or a broadcasting transmission line. The receiving device converts (depackets) the stream of packets into contents biological influence level information and units of MPEG multiplexed audio-visual data. The receiving device feeds the contents biological influence level information to the detector 1505. The receiving device sequentially feeds the units of MPEG multiplexed audio-visual data to the demultiplexer 1504. Furthermore, the receiving device extracts pack separating information from the read-out units of MPEG multiplexed audio-visual data. The receiving device feeds the extracted pack separating information to the demultiplexer 1504.

The receiving device may separate D_PACKs inclusive of the contents biological influence level information from the stream of packets. In this case, the receiving device sequentially outputs the D_PACKs to the detector 1505.

The demultiplexer 1504 separates each unit of MPEG multiplexed audio-visual data into V_PACKs and A_PACKs in response to the pack separating information. Thus, the demultiplexer 1504 separates each unit of MPEG multiplexed audio-visual data into MPEG video data and MPEG audio data in response to the pack separating information. The demultiplexer 1504 feeds the MPEG video data and the MPEG audio data to the decoder 707 and the decoder 708, respectively.

The device 1505 detects the contents biological influence level information in the output signal from the reproducer 1503 or the receiving device. The detector 1505 feeds the detected contents biological influence level information to the decider 706.

The biological influence view level is set in advance for a viewer. Reproduced pictures can be selected or altered in response to the biological influence view level. A certain scene in a stream of reproduced pictures can be skipped in response to the biological influence view level. Therefore, contents data can be played back in a fashion safe and proper to the viewer.

Eighth Embodiment

An eighth embodiment of this invention is similar to the fourth embodiment thereof (FIGS. 19 and 20) except for design changes mentioned hereafter. Basically, the eighth embodiment of this invention is similar in operation to the seventh embodiment thereof (FIG. 25). The eighth embodiment of this invention includes the reproducer 1503 (FIG. 25) instead of the reproducer 703 (FIG. 19).

Figure 26:
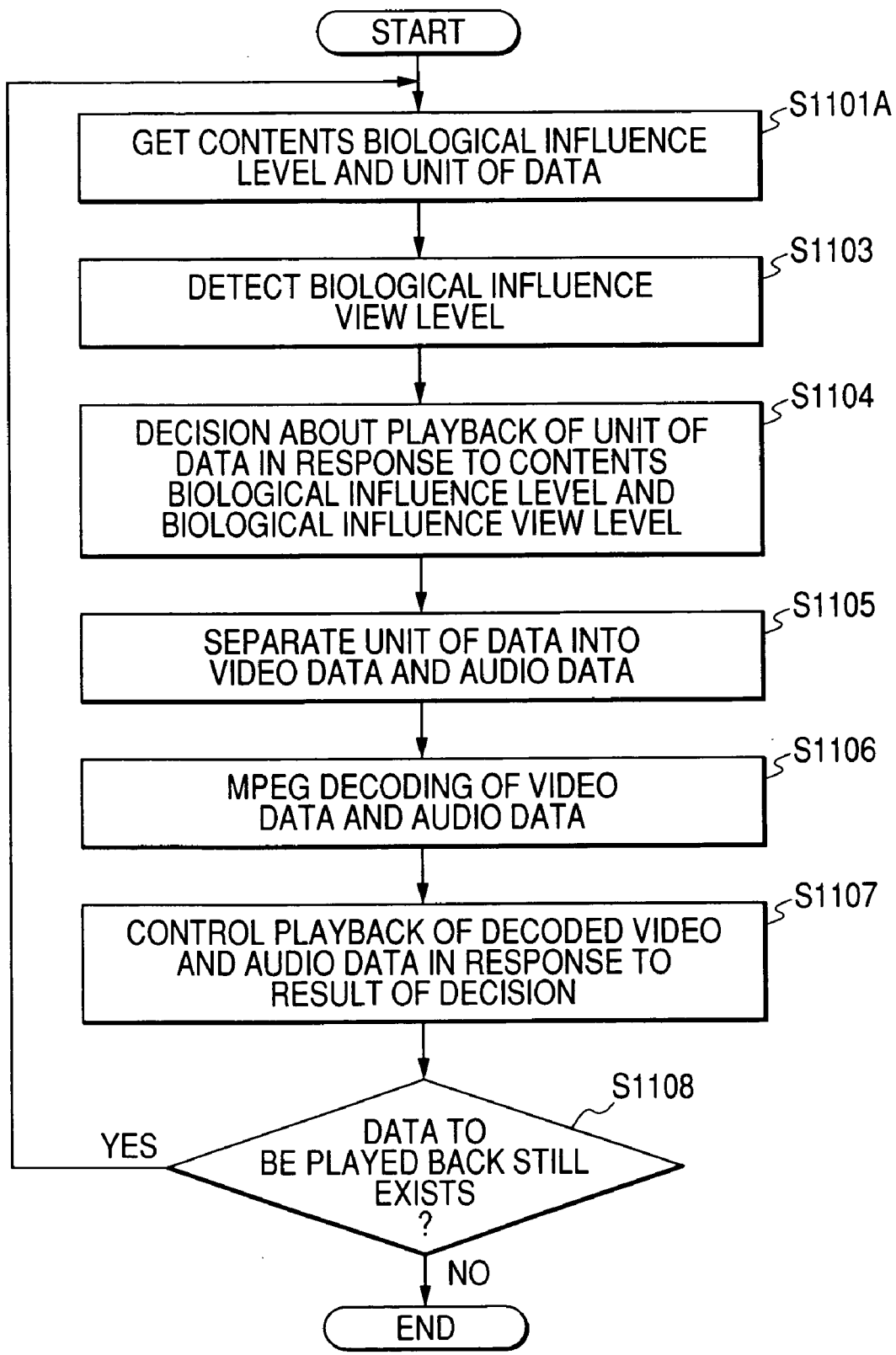
FIG. 26 is a flowchart of a segment of a control program for a computer system in an eighth embodiment of this invention.

FIG. 26 is a flowchart of a segment of a control program for the computer system 800 (FIG. 19) in the eighth embodiment of this invention. The control program segment in FIG. 26 is a modification of the control program segment in FIG. 20. Specifically, the control program segment in FIG. 26 includes a step S1101A instead of the step S1101 (FIG. 20). Furthermore, the step S1102 (FIG. 20) is omitted from the control program segment in FIG. 26. Thus, the step S1101A is immediately followed by the step S1103 in FIG. 26.

The step S1101A controls the reproducer 1503 (FIG. 25) to read out contents biological influence level information and a unit of MPEG multiplexed audio-visual data from the recording medium 110A. The step S1101A receives the read-out contents biological influence level information and the read-out unit of MPEG multiplexed audio-visual data from the reproducer 1503. Alternatively, the step S1101A may receive a stream of packets of data from the communication-network transmission line or the broadcasting transmission line. In this case, the step S1101A converts the received packet data into contents biological influence level information and a unit of MPEG multiplexed audio-visual data.

Ninth Embodiment

Figure 27:
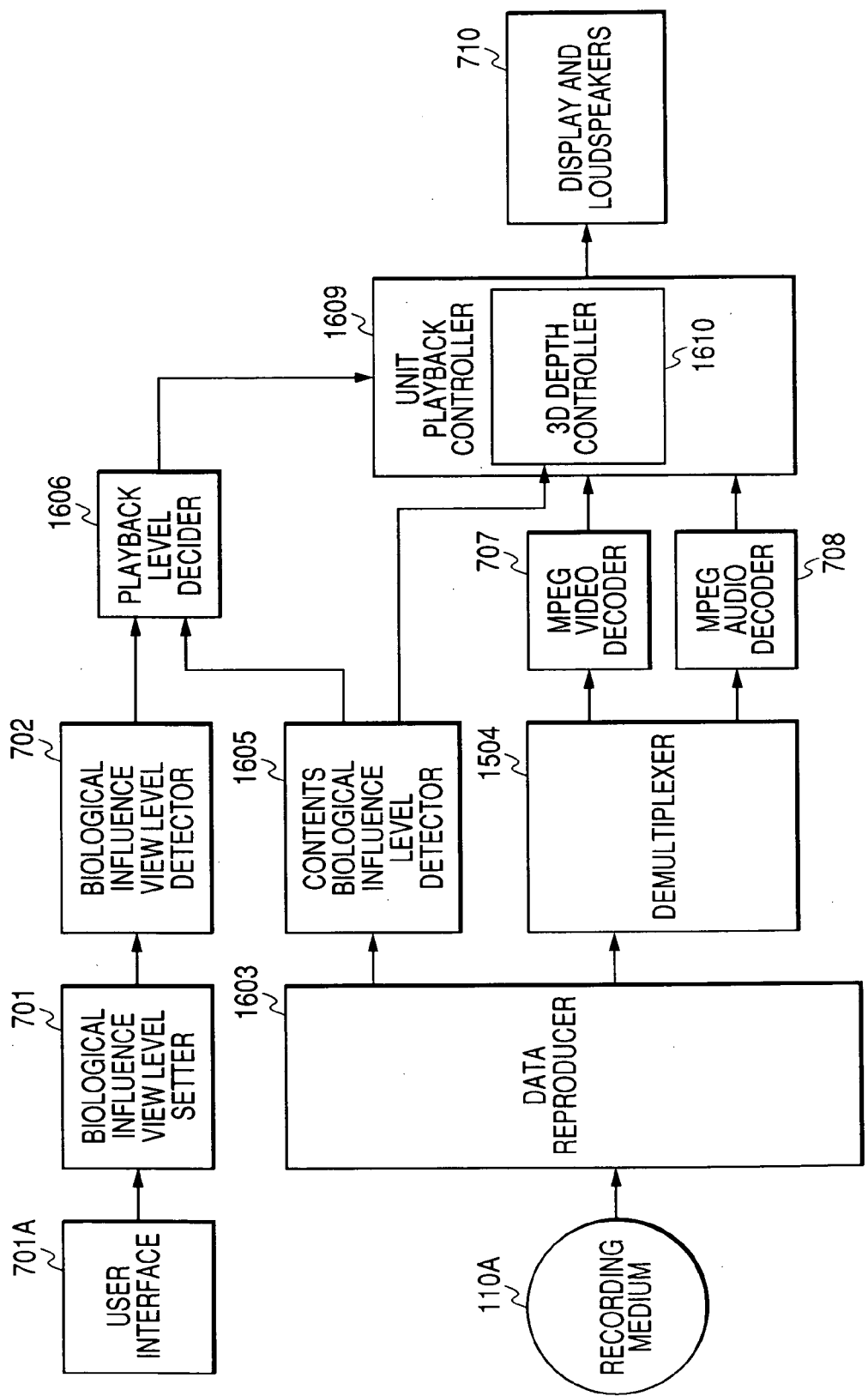
FIG. 27 is a block diagram of a video data reproducing apparatus according to a ninth embodiment of this invention.

FIG. 27 shows a video data reproducing apparatus according to a ninth embodiment of this invention. The apparatus of FIG. 27 is similar to the apparatus of FIG. 25 except for design changes mentioned hereafter.

The apparatus of FIG. 27 includes a data reproducer 1603, a contents biological influence level detector 1605, a playback level decider 1606, and a unit playback controller 1609 instead of the data reproducer 1503, the contents biological influence level detector 1505, the playback level decider 706, and the unit playback controller 709 (FIG. 25).

The data reproducer 1603 can access the recording medium 110A. The data reproducer 1603 is connected with the demultiplexer 1504 and the contents biological influence level detector 1605. The contents biological influence level detector 1605 is followed by the playback level decider 1606 and the unit playback controller 1609. The playback level decider 1606 is connected with the biological influence view level detector 702 and the unit playback controller 1609. The unit playback controller 1609 is connected with the MPEG video decoder 707, the MPEG audio decoder 708, and the output device 710. The unit playback controller 1609 includes a 3D picture depth information controller 1610 connected with the contents biological influence level detector 1605.

The contents playback mode of operation of the apparatus in FIG. 27 is as follows. The reproducer 1603 sequentially reads out D_PACKs inclusive of contents biological influence level information and depth information pieces ZP from the recording medium 110A, and sequentially reads out units (for example, VOBUs) of MPEG multiplexed audio-visual data therefrom. The reproducer 1603 sequentially feeds the read-out D_PACKs to the detector 1605. The reproducer 1603 sequentially feeds the read-out units of MPEG multiplexed audio-visual data to the demultiplexer 1504. Furthermore, the reproducer 1603 extracts pack separating information from the read-out units of MPEG multiplexed audio-visual data. The reproducer 1603 feeds the extracted pack separating information to the demultiplexer 1504.

It should be noted that a receiving device connected with the demultiplexer 1504 and the detector 1605 may be provided. The receiving device receives a stream of packets of data from a communication-network transmission line or a broadcasting transmission line. The receiving device converts (depackets) the stream of packets into D_PACKs and units of MPEG multiplexed audio-visual data. Each of the D_PACKs includes contents biological influence level information and depth information pieces ZP. The receiving device sequentially feeds the D_PACKs to the detector 1605. The receiving device sequentially feeds the units of MPEG multiplexed audio-visual data to the demultiplexer 1504. Furthermore, the receiving device extracts pack separating information from the read-out units of MPEG multiplexed audio-visual data. The receiving device feeds the extracted pack separating information to the demultiplexer 1504.

The detector 1605 separates each of the D_PACKs into contents biological influence level information and depth information pieces ZP. The detector 1605 feeds the contents biological influence level information to the decider 1606. The detector 1605 feeds the depth information pieces ZP to the controller 1610 within the controller 1609.

The decider 1606 receives the biological influence view level information and the contents biological influence level information from the detectors 702 and 1605. The device 1606 decides a control value for 3D picture depth information on the basis of the biological influence view level information and the contents biological influence level information. The decider 1606 notifies the decided control value to the controller 1609.

The controller 1609 passes the control value to the controller 1610. For every unit related to the video data, the controller 1610 corrects the 3D picture depth information (the depth information pieces ZP) in response to the control value. Thus, for every unit, the controller 1609 corrects 3D video data, which includes the depth information, in accordance with the correction of the 3D picture depth information by the controller 1610. The controller 1609 feeds the corrected 3D video data to the device 710. The display in the device 710 visualizes the corrected 3D video data. The 3D pictures indicated on the display reflect the correction of the depth information by the controller 1610.

Regarding the processing of audio data, operation of the apparatus of FIG. 27 is the same as that of apparatus of FIG. 25.

The value represented by the 3D picture depth information is proportional to the protrusion quantity or the retreat quantity of a 3D picture portion. Thus, the value represented by the 3D picture depth information closely correlates to the convergence angle of the visual sensation of a viewer which determines the degree of the influence of an indicated 3D picture on the viewer's body.

A proper value related to the dynamic range of the protrusion quantity or the retreat quantity of a 3D picture portion is determined on the basis of the relation between the biological influence view level and the contents biological influence level. The depth in 3D pictures is controlled in accordance with the determined value. Therefore, the depth in every scene in a 3D picture stream can be properly set in response to the determined value.

The decider 1606 includes a memory loaded with a reference table or matrix shown in FIG. 28. The reference table has an array of cells (elements). Each of the cells is assigned to one of the 8 different contents biological influence levels and one of the 8 different biological influence view levels. Each cell has a control value for 3D picture depth information.

With reference to FIG. 28, in the case where the biological influence view level is equal to or greater than the contents biological influence level, a control value in each cell is "1". On the other hand, in the case where the biological influence view level is smaller than the contents biological influence level, a control value in each cell is equal to M/N, that is, the biological influence view level "M" divided by the contents biological influence level "N". As shown in FIG. 28, all the control values in the reference table are equal to or less than "1".

The device 1606 decides the control value for 3D picture depth information by referring to the reference table of FIG. 28 in response to the contents biological influence level and the biological influence view level. The decider 1606 notifies the decided control value to the controller 1610 within the controller 1609.

Alternatively, the decider 1606 may dispense with the reference table of FIG. 28. In this case, the decider 1606 compares the contents biological influence level and the biological influence view level. When the result of the comparison indicates that the biological influence view level is equal to or greater than the contents biological influence level, the decider 1606 sets the control value for 3D picture depth information to "1". On the other hand, when the result of the comparison indicates that the biological influence view level is smaller than the contents biological influence level, the decider 1606 sets the control value for 3D picture depth information to M/N which is less than "1".

In the case where depth information pieces ZP and the contents biological influence level information are recorded on a common area of the recording medium 110A, the reproducer 1603 reads out the depth information pieces ZP from the recording medium 110A together with the contents biological influence level information. In this case, the read-out depth information pieces ZP are sent from the reproducer 1603 to the controller 1610 within the controller 1609 via the detector 1605 for every unit related to the video data.

Each depth information piece ZP represents a value variable among 256 different values from "−128" to "+127". The controller 1610 multiplies the value of each depth information piece ZP by the control value to correct the value of the depth information piece ZP and to get a corrected depth information piece ZPc. The controller 1610 replaces the original depth information piece ZP with the corrected depth information piece ZPc. When the biological influence view level is equal to or greater than the contents biological influence level, the control value is "1" so that the original depth information piece ZP is not corrected and is directly used as the corrected depth information piece ZPc. On the other hand, when the biological influence view level is smaller than the contents biological influence level, the control value is M/N and is less than "1" so that the original depth information piece ZP is corrected into the corrected depth information piece ZPc in the direction of reducing "depth" or "depth-related dynamic range".

The control value depends on the contents biological influence level (see FIG. 28) which is decided by the contents of the video data. As the contents biological influence level corresponds to a greater possibility of the harmful influence of related 3D pictures on viewer's body, the control value is decreased (see FIG. 28) and hence the dynamic range of the protrusion quantity or the retreat quantity of a 3D picture portion is reduced in accordance with the decrease in the control value. The reduction of the protrusion quantity or the retreat quantity causes indicated 3D pictures to less affect the viewer's body. The control value also depends on the biological influence view level (see FIG. 28) which is decided by, for example, the age of a viewer. As the biological influence view level corresponds to a greater possibility of the harmful influence of related 3D pictures on the viewer's body, the control value is decreased (see FIG. 28) and hence the dynamic range of the protrusion quantity or the retreat quantity of a 3D picture portion is reduced in accordance with the decrease in the control value. The reduction of the protrusion quantity or the retreat quantity causes indicated 3D pictures to less affect the viewer's body.

For example, the display in the output device 710 uses the following method of generating 3D pictures from 2D video data and the depth information corrected by the controller 1610. View field transformation is used for transformation of a coordinate system in CG (computer graphics), and a viewpoint-shifted picture is generated according to an equation of transformation to a viewpoint coordinate system. In the presence of depth information, it is possible to obtain a viewpoint-freely-shifted picture.

The coordinates of the viewpoint Of are expressed as $(x_i, y_i, z_i)$. The coordinates of the observed point Oa are expressed as $(x_a, y_a, z_a)$. The distance between the viewpoint and the observed point is expressed as $(x_f, y_f, z_f)$, where:

$$x_f = x_i - x_a$$

$$y_f = y_i - y_a$$

$$z_f = z_i - z_a$$

Figure 29:
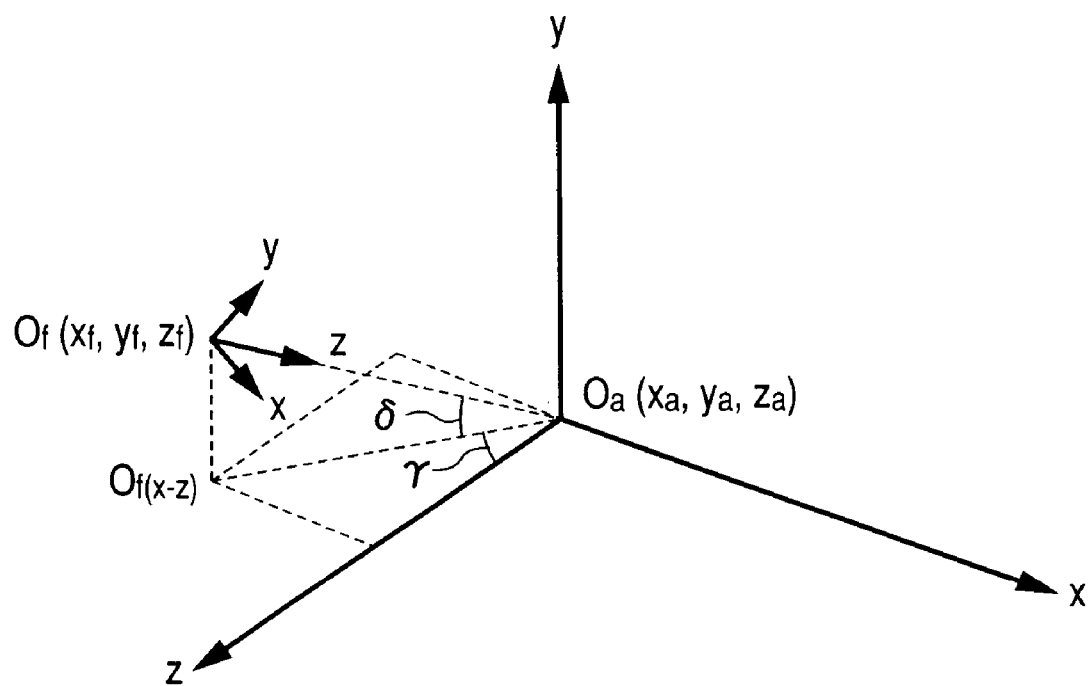
FIG. 29 is a diagram of coordinates of a viewpoint and an observed point in the ninth embodiment of this invention.

With reference to FIG. 29, the origin of the coordinate axes is translated into coincidence with the observed point Oa through transformation T1. The transformation T1 means $(-x_a, -y_a, -z_a)$ translation. As a result of the transformation T1, the coordinates of the viewpoint Of are expressed as $(x_f, y_f, z_f)$. In FIG. 29, the character Of(x-z) denotes a point resulting from projection of the viewpoint Of onto the x-z plane. The directions of the coordinate values are changed by rotations. Specifically, a vector from the observed point Oa toward the viewpoint Of is rotated about the "y" axis through an angle of "γ" degrees, and is then rotated about the "x" axis through an angle of "δ" degrees. In fact, the coordinate values of the viewpoint Of are moved to implement the rotations, and hence the directions of the rotations are opposite to those shown in FIG. 29. The rotation about the "y" axis through an angle of "−γ" degrees is defined as transformation T2. The rotation about the "x" axis through an angle of "−δ" degrees is defined as transformation T3.

As understood from FIG. 29, the coordinate values "$x_f$", "$y_f$", and "$z_f$" of the viewpoint Of, and the angles "γ" and "δ" are in the following relations.

$$\sin\gamma = \frac{xf}{\sqrt{xf^2 + zf^2}}, \quad \sin\delta = \frac{yf}{\sqrt{xf^2 + yf^2 + zf^2}}$$

$$\cos\gamma = \frac{zf}{\sqrt{xf^2 + zf^2}}, \quad \cos\delta = \frac{\sqrt{xf^2 + zf^2}}{\sqrt{xf^2 + yf^2 + zf^2}}$$

After the transformations T2 and T3, transformation T4 is performed. The transformation T4 changes the coordinate system from the present type to another type (a second type). In the present-type coordinate system, the "z" axis points toward viewer's eyes. In the second-type coordinate system, the "z" axis points along the direction away from viewer's eyes. The transformation T4 means conversion as "z→−z". The product of the matrixes of the transformations T1, T2, T3, and T4 results in an overall matrix T of transformation to the viewpoint coordinate system. The transformation matrix T of a 4th-order extended version is given as:

$$T = \begin{bmatrix} \cos\gamma & \sin\gamma\sin\delta & -\sin\gamma\cos\delta & 0 \\ 0 & \cos\delta & \sin\delta & 0 \\ -\sin\gamma & \cos\gamma\sin\delta & -\cos\gamma\cos\delta & 0 \\ -x_a\cos\gamma + z_a\sin\gamma & -x_a\sin\gamma\sin\delta - y_a\cos\delta - z_a\cos\gamma\sin\delta & x_a\sin\gamma\cos\delta - y_a\sin\delta + z_a\cos\gamma\cos\delta & 1 \end{bmatrix}$$

In the case where the display in the output device 710 is of a binocular stereopsis type using a liquid-crystal parallax barrier, a left eye image and a right eye image providing a parallax are generated by using the transformation matrix T while properly setting the value "γ" according to the view distance (the distance between the viewpoint and the observed point), setting the value "δ" to "0", and placing the resultant values "γ" and "δ" in the transformation matrix T. In the case where the display in the output device 710 is of an IP (integral photography or integral imaging) type, parallax images are calculated from IP images captured by cameras corresponding to the positions of lenses according to the transformation matrix T.

The display in the output device 710 may be of another 3D type such as a lenticular lens type or an anaglyph type. Preferably, the display in the output device 710 is of a binocular stereopsis type or a multi-view stereopsis type designed to apply different images to a left eye and a right eye respectively.

The biological influence view level is set in advance for a viewer. The depth effect of 3D pictures can be reduced in response to the biological influence view level. Thus, it is possible to prevent a viewer from being intoxicated with indicated 3D pictures. Therefore, contents data can be played back in a fashion safe and proper to the viewer.

It should be noted that the apparatus of FIG. 27 may be modified to be capable of reproducing data recorded or transmitted by the apparatus of FIG. 8.

Tenth Embodiment

A tenth embodiment of this invention is similar to the fourth embodiment thereof (FIGS. 19 and 20) except for design changes mentioned hereafter. Basically, the tenth embodiment of this invention is similar in operation to the ninth embodiment thereof (FIGS. 27 and 28). The tenth embodiment of this invention includes the reproducer 1603 (FIG. 27) instead of the reproducer 704 (FIG. 19).

Figure 30:
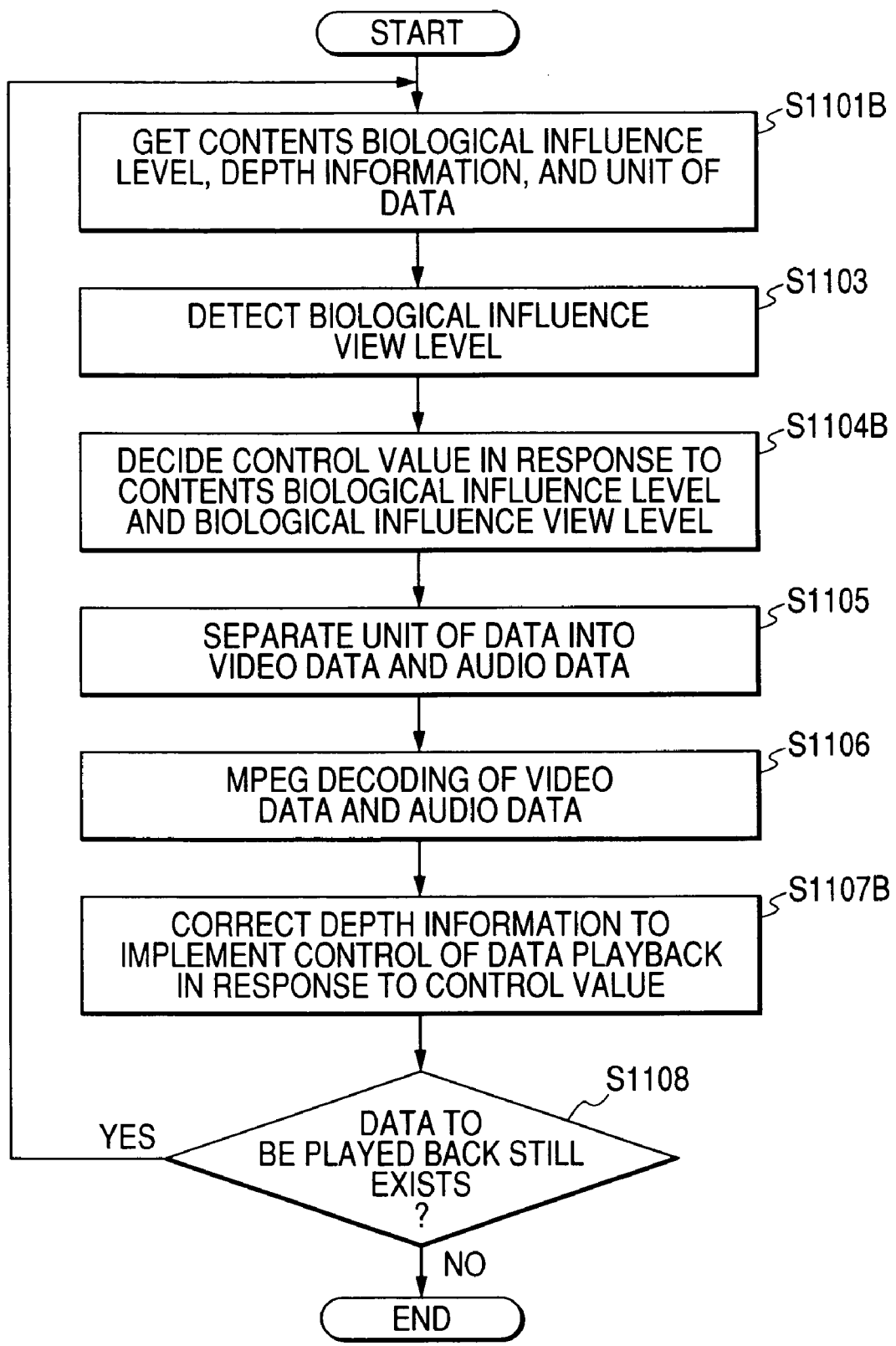
FIG. 30 is a flowchart of a segment of a control program for a computer system in a tenth embodiment of this invention.

FIG. 30 is a flowchart of a segment of a control program for the computer system 800 (FIG. 19) in the tenth embodiment of this invention. The control program segment in FIG. 30 is a modification of that in FIG. 20. Specifically, the control program segment in FIG. 30 includes steps S1101B, S1104B, and S1107B instead of the steps S1101, S1104, and S1107 (FIG. 20). Furthermore, the step S1102 (FIG. 20) is omitted from the control program segment in FIG. 30. Thus, the step S1101B is immediately followed by the step S1103 in FIG. 30.

The step S1101B controls the reproducer 1603 (FIG. 27) to read out a D_PACK and a unit of MPEG multiplexed audio-visual data from the recording medium 110A, and to extract pack separating information from the read-out unit of MPEG multiplexed audio-visual data. The D_PACK includes contents biological influence level information and depth information pieces ZP related to the unit of MPEG multiplexed audio-visual data. The step S1101B receives the read-out D_PACK, the read-out unit of MPEG multiplexed audio-visual data, and the pack separating information from the reproducer 1603. The step S1101B extracts the contents biological influence level information and the depth information pieces ZP from the received D_PACK.

It should be noted that the step S1101B may receive a stream of packets of data from the communication-network transmission line or the broadcasting transmission line. In this case, the step S1101B converts the received packet data into a D_PACK and a unit of MPEG multiplexed audio-visual data. Furthermore, the step S1101B extracts pack separating information from the unit of MPEG multiplexed audio-visual data. In addition, the step S1101B extracts contents biological influence level information and depth information pieces ZP from the D_PACK.

The step S1104B decides the control value for 3D picture depth information by referring to the reference table of FIG. 28 in response to the contents biological influence level and the biological influence view level. Alternatively, the step S1104B may dispense with the reference table of FIG. 28. In this case, the step S1104B compares the contents biological influence level and the biological influence view level. When the biological influence view level is equal to or greater than the contents biological influence level, the step S1104B sets the control value for 3D picture depth information to "1". On the other hand, when the biological influence view level is smaller than the contents biological influence level, the step S1104B sets the control value for 3D picture depth information to M/N which is less than "1".

The step S1107B multiplies the values of the depth information pieces ZP by the control value to correct them and to get corrected depth information pieces ZPc. The step S1107B replaces the original depth information pieces ZP with the corrected depth information pieces ZPc. The step S1107B feeds the decoded video data and the decoded audio data to the output device 710 (FIG. 19). The step S1107B feeds the corrected depth information pieces ZPc to the output device 710 together with the decoded video data. The display in the output device 710 visualizes the decoded video data in a 3D fashion responsive to the corrected depth information pieces ZPc. At the same time, the loudspeakers in the output device 710 converts the decoded audio data into sounds. Accordingly, the playback of the unit of data (contents data) is implemented.

Eleventh Embodiment

An eleventh embodiment of this invention is similar to one of the first to tenth embodiments thereof except for the following design change.

The eleventh embodiment of this invention uses another viewer-related item or another contents-related item which has a correlation with a biological body, and which differs from the age of the viewer, the degree of viewer's immersion in displayed pictures, the visual sensation of the viewer, the autonomic nervous system of the viewer, the viewing environments, the viewing time, the picture spatial frequency, the picture temporal frequency, the picture resolution, the picture contrast, the picture flicker, the picture distortion, the binocular parallax, and the convergence.

Twelfth Embodiment

A twelfth embodiment of this invention is similar to the ninth embodiment (FIGS. 27 and 28) or the tenth embodiment (FIG. 30) thereof except for the following design change. In the twelfth embodiment of this invention, the correction of video data in response to the biological influence view level and the contents biological influence level is designed to control the convergence-related condition of displayed 3D pictures, the protrusion quantity of portions of displayed 3D pictures, the speed of the protrusion of portions of displayed 3D pictures, the presence-related condition of displayed 3D pictures, the powerfulness of displayed 3D pictures, or the viewer-focus-related condition of displayed 3D pictures rather than the depth of portions of displayed 3D pictures.

Thirteenth Embodiment

A thirteenth embodiment of this invention is similar to one of the first to twelfth embodiments thereof except for the following design change. In the thirteenth embodiment of this invention, the control of video data in response to the biological influence view level and the contents biological influence level has a step of reducing the contrast (the luminance variation or difference) of a pattern in a picture represented by the video data. According to an example of the contrast reduction, a picture pattern having a black level of "16" and a white level of "235" is corrected into a picture pattern having a black level of "40" and a white level of "200".

Fourteenth Embodiment

A fourteenth embodiment of this invention is similar to one of the first to thirteenth embodiments thereof except for the following design change. In the fourteenth embodiment of this invention, the control of video data in response to the biological influence view level and the contents biological influence level is designed to reduce the dynamic range of the luminance components of the video data and to subject pictures represented by the video data to gamma correction.

According to an example of the dynamic range reduction, "128" is subtracted from an 8-bit luminance signal variable in the range of "0" to "255", and the subtraction result is multiplied by a prescribed value equal to or less than "1.0" and then "128" is added to the multiplication result. Another example of the dynamic range reduction utilized a ROM storing data representing a gamma curve.

Fifteenth Embodiment

A fifteenth embodiment of this invention is similar to the thirteenth embodiment thereof except for the following design change. According to the fifteenth embodiment of this invention, after the contrast reduction is performed, the contrast of a given number of successive pictures is maintained at a constant value or limited to below a prescribed value. This action prevents a sudden change in the contrast which might cause displayed pictures to be unnatural to a viewer.

ADVANTAGES OF THE INVENTION

This invention has advantages as follows. The playback of 2D or 3D pictures can be properly controlled in consideration for the influence of the pictures on the biological body of a viewer. Furthermore, 2D or 3D pictures can be presented in a fashion safe to a viewer. In addition, 2D or 3D pictures can be presented safely and properly in view of the age of a viewer or the condition of viewer's health.

What is claimed is:

1. A picture reproducing apparatus comprising:
   first means for reproducing three-dimensional video data having divided units each representing pictures and each including contents biological influence level information and depth information which have been compressed by run length encoding, wherein specified units among the divided units are assigned to a same playback timing, and the contents biological influence level information in each divided unit indicates an estimated level of influence of video contents in said divided unit on a biological body and the depth information in each divided unit determines an actual degree of influence of a depth in the pictures represented by said divided unit on a viewer;

second means for detecting the contents biological influence level information in each divided unit;

third means for obtaining an estimated degree of influence of the depth in the pictures represented by each divided unit on the viewer from the contents biological influence level information detected by the second means;

fourth means for setting an allowable range with respect to the estimated influence degree obtained by the third means;

fifth means for deciding whether the estimated influence degree obtained by the third means is within or outside the allowable range set by the fourth means; and sixth means for controlling the depth information in a divided unit to reduce the actual degree of influence of the depth in the pictures represented by said divided unit on the viewer when the fifth means decides that the estimated influence degree is outside the allowable range for said divided unit.

2. A non-transitory program stored in computer-readable store means, for enabling a computer to implement a method comprising the steps of:

controlling a data reproducer to reproduce three-dimensional video data having divided units each representing pictures and each including contents biological influence level information and depth information which have been compressed by run length encoding, wherein specified units among the divided units are assigned to a same playback timing, and the contents biological influence level information in each divided unit indicates an estimated level of influence of video contents in said divided unit on a biological body and the depth information in each divided unit determines an actual degree of influence of a depth in the pictures represented by said divided unit on a viewer;

detecting the contents biological influence level information in each divided unit;

obtaining an estimated degree of influence of the depth in the pictures represented by each divided unit on the viewer from the detected contents biological influence level information;

setting an allowable range with respect to the estimated influence degree on the basis of viewer-related information inputted via user interface means;

deciding whether the estimated influence degree is within or outside the allowable range; and controlling the depth information in a divided unit to reduce the actual degree of influence of the depth in the pictures represented by said divided unit on the viewer when it is decided that the estimated influence degree is outside the allowable range for said divided unit.

3. A method of reproducing pictures via a display device, comprising the steps of:

controlling a data reproducer to reproduce three-dimensional video data having divided units each representing pictures and each including contents biological influence level information and depth information which have been compressed by run length encoding, wherein specified units among the divided units are assigned to a same playback timing, and the contents biological influence level information in each divided unit indicates an estimated level of influence of video contents in said divided unit on a biological body and the depth information in each divided unit determines an actual degree of influence of a depth in the pictures represented by said divided unit on a viewer;

detecting the contents biological influence level information in each divided unit;

obtaining an estimated degree of influence of the depth in the pictures represented by each divided unit on the viewer from the detected contents biological influence level information;

setting an allowable range with respect to the estimated influence degree on the basis of viewer-related information inputted via user interface means;

deciding whether the estimated influence degree is within or outside the allowable range; and controlling the depth information in a divided unit to reduce the actual degree of influence of the depth in the pictures represented by said divided unit on the viewer when it is decided that the estimated influence degree is outside the allowable range for said divided unit.

* * * * *